US009670373B2

(12) United States Patent
Madsen et al.

(10) Patent No.: US 9,670,373 B2
(45) Date of Patent: Jun. 6, 2017

(54) POLYMERS COMPRISING PHOTOINITIATOR MOIETIES AND DYE MOIETIES

(75) Inventors: Niels Joergen Madsen, Alleroed (DK); Christian B. Nielsen, Copenhagen NV (DK); Petr Sehnal, York (GB); David George Anderson, York (GB)

(73) Assignee: Lambson Limited (GB)

( * ) Notice: Subject to any disclaimer, the term of this patent is extended or adjusted under 35 U.S.C. 154(b) by 483 days.

(21) Appl. No.: 14/240,704

(22) PCT Filed: Aug. 24, 2012

(86) PCT No.: PCT/DK2012/000096
§ 371 (c)(1),
(2), (4) Date: Jul. 3, 2014

(87) PCT Pub. No.: WO2013/026451
PCT Pub. Date: Feb. 28, 2013

(65) Prior Publication Data
US 2014/0316060 A1    Oct. 23, 2014

(30) Foreign Application Priority Data

| Aug. 24, 2011 | (DK) | 2011 70468 |
| Aug. 30, 2011 | (DK) | 2011 70482 |
| Oct. 21, 2011 | (DK) | 2011 70578 |
| Jan. 2, 2012 | (DK) | 2012 70002 |
| Jan. 2, 2012 | (DK) | 2012 70003 |
| May 16, 2012 | (DK) | 2012 70260 |

(51) Int. Cl.
*C09D 11/328* (2014.01)
*C09B 62/00* (2006.01)
*C09D 11/101* (2014.01)
*C08F 2/50* (2006.01)
*C08F 2/48* (2006.01)
*C09D 11/023* (2014.01)
*C08F 2/46* (2006.01)

(52) U.S. Cl.
CPC .............. *C09D 11/328* (2013.01); *C08F 2/50* (2013.01); *C09B 62/00* (2013.01); *C09D 11/101* (2013.01); *C08F 2/46* (2013.01); *C08F 2/48* (2013.01); *C08G 2261/1642* (2013.01); *C09D 11/023* (2013.01)

(58) Field of Classification Search
CPC ..... C08F 2/46; C08F 2/48; C08F 2/50; C09D 11/101; C09D 11/328; C09D 11/023; C08G 2261/1642; C09B 62/00–62/84
USPC ......... 430/253, 256, 286.1, 287.1, 293, 294, 430/325; 522/162; 524/590; 528/73, 74, 528/76.79
See application file for complete search history.

(56) References Cited

U.S. PATENT DOCUMENTS 3,918,976 A * 11/1975 Arai .................... C09B 1/325
250/472.1
5,334,485 A * 8/1994 Van Iseghem ....... C07D 215/14
430/281.1
5,362,812 A    11/1994 Holmes et al.
5,532,111 A    7/1996 Holmes et al.
5,607,824 A *  3/1997 Fahey ................. C08G 65/4012
430/271.1
5,741,620 A    4/1998 Holmes et al.
7,148,265 B2 * 12/2006 Barr ...................... G03F 7/027
430/286.1

FOREIGN PATENT DOCUMENTS

WO    WO 2010069758 A1 *  6/2010 ............. C07C 69/54

OTHER PUBLICATIONS

PCT International Search Report and Written Opinion for PCT/DK2012/000096 issued Oct. 5, 2012.
Fouassier; Excited-State Reactivity in Radical Polymerisation Photoinitiators; pp. 1-59; France.
Nguyen, et al.; Maleimide Reactive Oligomers; pp. 589-594.
Bruno, et al.; Second Harmonic Generation in Polymers Containing a New Azo Chromophore Based on Phenylnitrobenzoxazole; Journal of Polymer Science: Part A: Polymer Chemistry, vol. 40, pp. 1468-1475; 2002.
Kopeinig, et al.; Further Covalently Boned Photoinitiators; RadTech Europe Conference & Exhibition; p. 375-381; 2005.
Wei, et al.; Novel Polymeric, Thio-Containing Photoinitiator Comprising In-Chain Benzophenone and an Amine Coinitiator for Photopolymerization; Journal of Polymer Science: Part A: Polymer Chemistry, vol. 45, pp. 576-587; 2007.
Wei, et al.; Novel Photsensitive Thio-Containing Polyurethane as Macrophotoinitiator Comprising Side-Chain Benzophenone and Co-Initiator Amine for Photopolymerization; American Chemical Society; vol. 40, pp. 2344-2351; 2007.
Wei, et al.; Novel PU-type Polymeric Photoinitiator Comprising Side-Chain Benzophenone and Coinitiator Amine for Photopolymerization of PU Acrylate; Polymers for Advanced Technologies; vol. 19, pp. 1763-1770; Jul. 15, 2008.
Wei, et al.; Novel Highly Efficient Macrophotoinitiator Comprising Benzophenone, Coinitiator Amine, and Thio Moieties for Photopolymerization; Macromolecules Article; vol. 42, pp. 5486-5491; 2009.
Klos, et al.; Photoinitiators with Functional Groups, Part 1, Polymer Photoinitiators; J. Macromol. Sci.-Chem., A28(9); pp. 925-947; 1991.

* cited by examiner

*Primary Examiner* — Ling Choi
*Assistant Examiner* — David L Miller
(74) *Attorney, Agent, or Firm* — Colin P. Cahoon; Shaukat A. Karjeker; Carstens & Cahoon, LLP

(57) ABSTRACT

The invention relates to a polymer (P) comprising at least one photoinitiator moiety (PI) and at least one dye moiety (DYE), wherein said at least one photoinitiator moiety (PI) and at least one dye moiety (DYE) are covalently linked to said polymer (P). Additionally, the invention relates to said polymer (P) being end-functionalized with optionally substituted acryloyi groups. The fact that both of these moieties are tightly bonded within the polymer, and the cross-linked polymer, means that the opportunities for leaching/migration of these components is reduced or even eliminated. Inks comprising at least one of said polymers are also provided. Methods for the manufacture of the polymers, and for printing are provided.

11 Claims, 4 Drawing Sheets

POLYMERS COMPRISING PHOTOINITIATOR MOIETIES AND DYE MOIETIES

FIELD OF THE INVENTION

The present invention relates to polymers comprising both photoinitiator moieties and dye moieties, and inks comprising said polymers.

BACKGROUND OF THE INVENTION

The requirements of printing inks are manifold. Among other requirements, inks for ink-jet printers should be low viscosity liquids or solutions prior to being printed, but then dry rapidly when printed, to form fixed print.

Meeting the physical and chemical requirements of printing, inks usually involves a number of components. However, in certain fields of technology (for instance, food packaging, medical devices or toys) it is especially important to reduce—or even eliminate—the possible leaching of ink components from the ink. Stricter requirements are therefore placed on inks for use in such technical fields.

EP 1616897 relates to polymeric co-initiators, described to be useful in radiation curable compositions such as varnishes, lacquers and printing inks, e.g. radiation curable inkjet inks.

EP2053103 provides ink-jet inks exhibiting improved complete curing and high curing speed, making them more suitable for food packaging applications.

Patent publications relating to polymer-bound dye materials include U.S. Pat. No. 5,459,222, U.S. Pat. No. 4,137,243, U.S. Pat. No. 5,786,410, U.S. Pat. No. 4,619,990, CN101665575, CN101735343 and KR20050016585.

Other publications relating to polymer-bound dye materials include J. Polym. Sci. A: Polym. Chem, Vol. 40, 1468-1475 (2002), J. Polym. Sci. A: Polym. Chem, Vol. 45, 576-587 (2007), Macromolecules, 2007, 40 (7), pp 2344-2351 and Macromolecules, 2009, 42 (15), pp 5486-5491.

OBJECT OF THE INVENTION

It is an object of the invention to provide a dye and additionally an ink in which the leaching of components is reduced or even eliminated. Particularly, these are suitable for use in an ink-jet printer.

SUMMARY OF THE INVENTION

It has been found that by linking certain components of an ink together via a polymer—the opportunities for these components to leach from the ink are reduced or eliminated.

So, in a first aspect, the present invention relates to a polymer (P) comprising at least one photoinitiator moiety (PI) and at least one dye moiety (DYE), wherein said at least one photoinitiator moiety (PI) and at least one dye moiety (DYE) are covalently linked to said polymer (P).

In the present invention, the photoinitiator moieties and dye moieties are covalently bonded to the same polymer. The fact that both of these moieties are tightly bonded within the polymer, i.e. prior to cross-linking, and the polymer is further cross-linked upon curing means that the opportunities for leaching/migration of these components are reduced or even eliminated.

A second aspect of the present invention relates to a polymer (P), as described above, having at least two ends, and wherein each end of said polymer (P) is end-functionalized with optionally-substituted acryloyl groups.

The acryloyl groups are themselves polymerizable under photoinitiated polymerization. This provides additional cross-linking and allows low molecular weight polymers to be used; thus providing low viscosity.

A third aspect of the present invention relates to a cross-linked polymer (P'), obtained from UV irradiation of the polymer (P) or polymer (P) being end-functionalized with acryloyl groups. A fourth aspect of the invention relates to an ink comprising at least one polymer (P) or polymer (P) being end-functionalized with acryloyl groups and a solvent. A fifth aspect of the invention relates to an ink comprising at least one polymer (P) or polymer (P) being end-functionalized with acryloyl groups, wherein the polymer (P) is in powder form.

A method for the manufacture of a polymer (P) is also provided, said method comprising the steps of:
 a. providing at least one first monomer (A) comprising a photoinitiator moiety (PI),
 b. providing at least one second monomer (B) comprising a dye moiety (DYE),
 c. optionally providing one or more additional monomers (C, D),
 d. polymerizing the first (A) and second (B) monomers, and optionally the additional monomers (C, D), together to form a polymer (P).

A method for the manufacture of a polymer (P) being end-functionalized with acryloyl groups is also provided, said method comprising the steps of:
 a. providing at least one first monomer (A) comprising a photoinitiator moiety (PI),
 b. providing at least one second monomer (B) comprising a dye moiety (DYE),
 c. optionally providing one or more additional monomers (C, D),
 d. polymerizing the first (A) and second (B) monomers, and optionally the additional monomers (C, D), to form a polymer (P), and
 e. end-functionalizing the ends of the polymer (P) with optionally-substituted acryloyl groups.

The invention also provides a method for printing on a substrate, said method comprising the steps of:
 a. providing an ink according to the invention;
 b. applying said ink to said substrate;
 c. exposing the ink to UV radiation so as to cross-link the polymer (P) or the acryloyl end-functionalized polymer (P).

The invention also provides a printed substrate obtainable through this method.

Further aspects of the invention are to be found in the description and the dependent claims.

LEGENDS TO THE FIGURE

DETAILED DISCLOSURE OF THE INVENTION

Definitions

Figure 1:
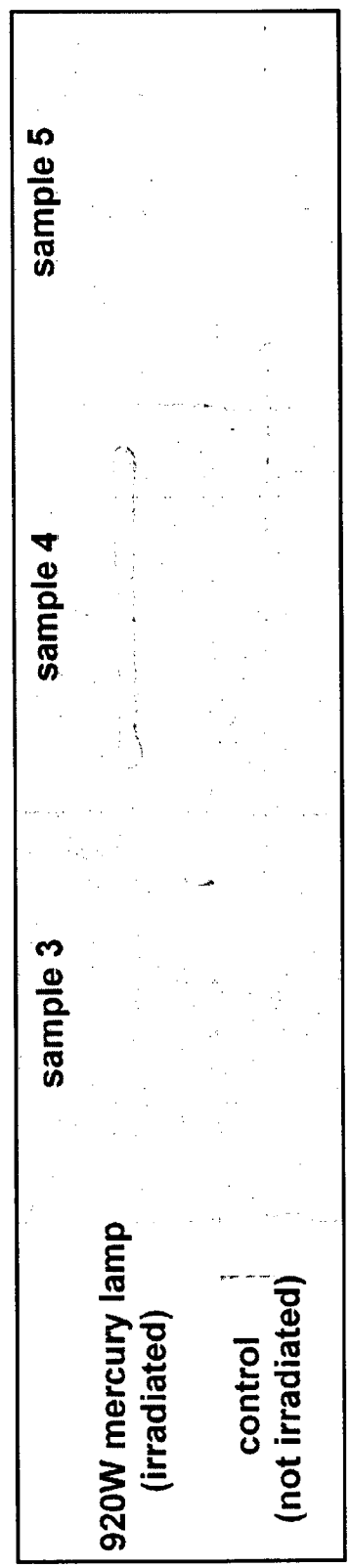
FIG. 1 shows fixing of dye samples 3-5 after 10 min dip test in water.

In the following, when a part of a molecule is described as "optionally substituted" it is meant that said part may be substituted by one or more substituents selected from: $C_1$-$C_6$ linear, branched or cyclic alkyl, aryl, —OH, —CN, —$NO_2$, halogens, amines, amides, alcohols, ethers, thioethers, sulfones and derivatives thereof, sulfoxides and derivatives thereof, carbonates, isocyanates, nitrates and acrylates.

Additionally, the one or more substituents may be an ester. For example said part may be substituted by 1 to 4 substituents, preferably 1 to 3 substituents, more preferably 1 or 2 substituents. In one specific embodiment of the invention the one or more substitutents is selected from the group consisting of —F, —Cl, —Br, —I, —CN, —NO$_2$, —C$_1$-C$_6$ alkyl, —C$_2$-C$_6$ alkenyl, —C$_3$-C$_6$ cycloalkyl, aryl, —O—(C$_1$-C$_6$ alkyl), —O—C$_3$-C$_8$ cycloalkyl, —O-aryl, —C(O)—O—(C$_1$-C$_6$ alkyl), —O—C(O)—(C$_1$-C$_6$ alkyl), —C(O)—O—C$_3$-C$_8$ cycloalkyl, —O—C(O)—C$_3$-C$_8$ cycloalkyl, —O—C(O)-aryl, —C(O)-aryl, —O—C(O)—O—(C$_1$-C$_6$ alkyl), —O—C(O)—O-aryl, —N(C$_1$-C$_6$alkyl)$_2$, —N(C$_1$-C$_6$alkyl)(C$_3$-C$_6$ cycloalkyl), —N(C$_1$-C$_6$alkyl)(aryl), —)$_2$, —N(R$^1$)—C(O)—(C$_1$-C$_6$ alkyl), —N(R")—C(O)-aryl, —C(O)—N(R")$_2$, —C(O)—N(R")-aryl, —C(O)—N(aryl)$_2$, —O—C(O)—N(R")$_2$, —O—C(O)—NH—(C$_1$-C$_6$aryl), —N(R")—C(O)—O—(C$_1$-C$_6$alkyl), —NH—C(O)—O—(C$_1$-C$_6$aryl), —S(O)—(C$_1$-C$_6$ alkyl), —S(O)-aryl, —SO$_2$—(C$_1$-C$_6$ alkyl), —SO$_2$-aryl, —S—(C$_1$-C$_6$ alkyl) and —S-aryl; wherein R" is H or C$_1$-C$_6$ alkyl. In a preferred embodiment of the invention, the one or more substituents are selected from the group consisting of —F, —Cl, —Br, —I, —CN, —NO$_2$, —C$_1$-C$_6$ alkyl, aryl, —O—(C$_1$-C$_6$ alkyl), —C(O)—O—(C$_1$-C$_6$ alkyl), —S—(C$_1$-C$_6$ alkyl), —S(O)—(C$_1$-C$_6$ alkyl), —SO$_2$—(C$_1$-C$_6$ alkyl), —NH—C(O)—(C$_1$-C$_6$ alkyl), —C(O)—NH—(C$_1$-C$_6$ alkyl), and —C(O)—NH$_2$.

Additionally, in relation to "optionally substituted acryloyl", in one embodiment of the invention the acryloyl moiety may be substituted by one or more substituents selected from —F, —Cl, —Br, —I, —CN, —NO$_2$, —C$_1$-C$_6$ alkyl, aryl and —C(O)—O—(C$_1$-C$_6$ alkyl). In a further embodiment, substituents comprising an ester bond is excluded from the here provided lists of substituents.

The term "heterocyclyl" means a non-aromatic monocyclic or multicyclic ring system comprising about 3 to about 10 ring atoms, preferably about 5 to about 10 ring atoms, in which one or more of the atoms in the ring system is an element other than carbon, for example nitrogen, oxygen or sulfur, alone or in combination. Preferred heterocyclyls contain about 5 to about 6 ring atoms. The prefix aza, oxa or thia before the heterocyclyl root name means that at least a nitrogen, oxygen or sulfur atom respectively is present as a ring atom. The heterocyclyl can be optionally substituted as described above. The nitrogen or sulfur atom of the heterocyclyl can be optionally oxidized to the corresponding N-oxide, S-oxide or S,S-dioxide. Non-limiting examples of suitable monocyclic heterocyclyl rings include piperidyl, pyrrolidinyl, piperazinyl, morpholinyl, thiomorpholinyl, thiazolidinyl, 1,3-dioxolanyl, 1,4-dioxanyl, tetrahydrofuranyl, tetrahydrothiophenyl, tetrahydrothiopyranyl, and the like.

The term "alkylene" is used in the following to specify moieties derived from alkanes in which two H atoms have been removed to form a diradical species. The simplest alkylene is methylene —CH$_2$—, and other alkylenes include ethylene —CH$_2$—CH$_2$—, propylene —C$_3$H$_6$— and butylene —C$_4$H$_8$—. The term "alkylene" includes branched, linear and cyclic alkylenes, with linear alkylenes being most preferred. An alkylene which is a C$_1$-C$_{12}$ alkylene is one which contains between 1 and 12 carbon atoms. Preferred alkylenes contain between 1 and 6 carbon atoms (i.e. C$_1$-C$_6$ alkylenes).

The term "alkenylene" is used in the following to specify moieties derived from alkenes in which two H atoms have been removed to form a diradical species. Examples include ethenylene —CH$_2$=CH$_2$— and propenylene —C$_3$H$_4$— moieties. The term "alkenylene" includes branched, linear and cyclic alkenylene, with linear alkenylene being most preferred.

The term "aryl" is used to define an unsaturated cyclic system which contains a delocalised π-electron system about the ring. Aryl groups may comprise from 4-12 atoms, suitably from 6-8 atoms, most suitably 6 atoms. "Aryl" preferably comprises carbocyclic rings, and is preferably phenyl (—C$_6$H$_5$). The term "aryl" in the present invention is also used to include aromatic heterocycles—rings in which one or more atoms in the ring (e.g. 1-3 atoms) are N, S, P or O. Aromatic heterocycles include pyrrole, furan, thiophene, imidazole, imidazoline, pyrazole, pyrazoline, oxazole, oxazoline, isoxazole, isoxazoline, thiazole, thiazoline; isothiazole, isothiazoline (5-membered rings), pyridine, pyran, thiopyran (6-membered rings). When referring to a linker moiety, the term "aryl" is used to define moieties derived from arenes in which two H atoms have been removed to form a diradical species (i.e. arylene). Examples include 1,2-phenylene, 1,3-phenylene and 1,4-phenylene. The term "aryl" also includes fused ring systems.

The term "acryloyl" is used to define the functional group with structure H$_2$C=CH—C(=O)—. It is the acyl group derived from acrylic acid. The preferred IUPAC name for the group is prop-2-enoyl. An acryloyl is a typical α,β-unsaturated carbonyl compound: it contains a carbon-carbon double bond and a carbon-oxygen double bond, separated by a carbon-carbon single bond. It has therefore the properties characteristic for both functional groups. Since both double bonds are separated by a single C—C bond, the double bonds are conjugated. Acryloyl groups readily participate in radical-catalysed polymerization at the C=C double bond.

The term "cycloalkyl" as used herein, unless otherwise indicated, includes non-aromatic saturated cyclic alkylene moieties, where alkylene is as defined above, or cyclic alkyl moieties, where alkyl is as defined above. The first applies where the cycloalkyl is used in a linker moiety being attached at two points to the remaining part of the formula in question. The skilled person will be able to identify in each case what applies. Examples of cycloalkyl include, but are not limited to, cyclopropyl, cyclobutyl, cyclopentyl, cyclohexyl, cycloheptyl, cyclooctyl. Cycloalkyl is preferably C$_3$-C$_8$ cycloalkyl, i.e. cycloalkyl groups containing from 3 to 10 carbon atoms, and more preferably C$_3$-C$_6$ cycloalkyl. The term "leaving group", abbreviated "LG", is used to describe a reactive moiety bound to a carbon atom that can be displaced by another moiety in a substitution reaction thus forming a new carbon-carbon or carbon-heteroatom bond. Typically a leaving group LG is —F, —Cl, —Br, —I, —OSO$_2$CH$_3$, —OSO$_2$—(p-C$_6$H$_4$)—CH$_3$, —OSO$_2$CF$_3$. Examples of leaving group also include reactive moieties that are a part a cyclic alkylating reagent. In a substitution reaction, the cyclic structure of the alkylating agent opens thus forming a new carbon-carbon or carbon-heteroatom bond and revealing a negatively charged moiety. Examples of such cyclic alkylating reagents include 1,3-propanesultone and 1,4-butanesultone.

Polymer (P)

In a first aspect, the present invention provides a polymer (P). The polymer (P) comprises at least one photoinitiator moiety (PI) and at least one dye moiety (DYE). The at least one photoinitiator moiety (PI) and the at least one dye moiety (DYE) are covalently linked to said polymer (P). As such, the polymer (P) acts as a backbone, or scaffold, for the photoinitiator moiety and the dye moiety. Suitably, the photoinitiator moiety (PI) and the dye moiety (DYE) are pendant on the polymer chain, making them more accessible for reaction with neighbouring molecules.

The backbone of polymer (P) may be formed by a wide variety of polymers or co-polymers, these may be selected to obtain desirable properties in the dye and photoinitiator containing final polymer (P) of the invention. Non-limiting examples of useful polymer backbones are polyurethanes, polyureas, polythiourethanes, polythioureas, polydithiourethanes, polyamides, polyesters, polycarbonates, polyphosphonites, polyphosphonates, polyphosphates, polyacrylates, polystyrenes and co-polymers of these.

Suitably the polymer (P) of the invention is selected from the group consisting of polyethylenes, polypropylenes, polyesters, polyethers, polyamides, polystyrenes, polyurethanes, polyacrylates, and co-polymers thereof. The weight average molecular weight of the polymer (P) is suitably in a range of 1000-10,000,000 Da (g/mol), preferably in a range of 1000-1,000,000 Da. For instance in relation to powder coatings it may preferably be in a range of 5.000-15,000 Da; in relation to solvent based coatings it may preferably be in a rang of 1000-50,000 Da, more preferably in a range of 1000-35,000 Da; and in relation to emulsion based coatings in a range of 50,000-10,000,000, such as e.g. for polyacrylates in a range of 500,000-2,000,000 Da, for emulsion based coatings preferably in a range of 500.000-1,000,000 Da.

In one preferred embodiment of the invention, the polymer (P), i.e. the backbone of the polymer, is selected from the group consisting of polyurethanes, polyethers, polyacrylates, and co-polymers thereof. In one specific embodiment of the invention, the polymer (P) is a polyurethane prepared from linear polyethers. Preferably, such polyethers may be polyethylene oxides, and the polyurethane part may be formed from one or more diisocyanate monomers and one or more dihydroxyl monomers, where for instance one dihydroxyl monomer have attached thereto a photoinitiator moiety (PI) and/or one dihydroxyl monomer have attached thereto a dye moiety (DYE).

The polymer (P) according to the invention is suitably a co-polymer of at least one first monomer (A) with at least one second monomer (B), wherein said first monomer comprises a photoinitiator moiety (PI) and said second monomer (B) comprises a dye moiety (DYE). Optionally one or more additional monomers (C, D, or E etc.) may be introduced. These components will be described in more detail in the following.

Polyurethanes

A polyurethane (PU) is a polymer consisting of a chain of organic units joined by urethane (carbamate) links —NH—(C=O)—O—. Polyurethanes are typically formed by the reaction between one monomer having at least two isocyanate functional groups (—NCO), and another monomer having at least two alcohol (—OH) groups. In their simplest form, due to the nature of the monomers from which they are prepared, polyurethanes comprise alternating A and B monomers (ABABABABA . . . ). Polyurethanes and polyurethane co-polymers will be described in more detail further below.

Polyureas

A polyurea is a polymer consisting of a chain of organic units joined by urea (carbamide) moieties —NH—(C=O)—NH—. Polyureas are typically formed by the reaction between one monomer having at least two isocyanate functional groups (—NCO) and another monomer having at least two amine (—NH$_2$) groups. Alternatively, polyureas can be formed by the reaction between one monomer having at least two amine (—NH$_2$) groups, and phosgene (COCl$_2$) or diphosgene (Cl—CO—OCCl$_3$).

Polythiourethanes

A polythiourethane is a generic name for polymers consisting of a chain of organic units joined by —NH—(C=O)—S— or —NH—(C=S)—O— links. The former type of polythiourethanes is formed by the reaction between one monomer having at least two isocyanate functional groups (—NCO), and another monomer having at least two thiol (—SH) groups. The latter type of polythiourethanes is formed by the reaction between one monomer having at least two isothiocyanate functional groups (—NCS), and another monomer having at least two alcohol (—OH) groups.

Polythioureas

A polythiourea is a polymer consisting of a chain of organic units joined by thiourea (thiocarbamide) moieties —NH—(C=S)—NH—. Polyureas are typically formed by the reaction between one monomer having at least two isothiocyanate functional groups (—NCS), and another monomer having at least two amine (—NH$_2$) groups. Alternatively, polyureas can be formed by the reaction between one monomer having at least two amine (—NH$_2$) groups, and thiophosgene (S=CCl$_2$).

Polydithiourethanes

A polydithiourethane is a polymer consisting of a chain of organic units joined by dithiourethane links —NH—(C=S)—S—. Polydithiourethanes are typically formed by the reaction between one monomer having at least two isothiocyanate functional groups (—NCS) and another monomer having at least two thiol (—SH) groups.

Polyamide

A polyamide is a polymer consisting of a chain of organic units joined by amide moieties —(C=O)—NR—, where R may be H or e.g. an alkyl group. Polyamides are typically formed by the reaction between one monomer having at least two activated carboxylic acid functional groups (—COX, where X is, e.g., a chloride or anhydride), and another monomer having at least two primary or secondary amino groups (—NH$_2$, —NHR) groups.

Polyesters

A polyester is a polymer consisting of a chain of organic units joined by ester moieties —(C=O)—O—. Polyesters are typically formed by the reaction between one monomer having at least two activated carboxylic acid functional groups (—COX, where X is, e.g., a chloride or anhydride) and another monomer having at least two alcohol (—OH) groups.

Polycarbonate

A polycarbonate is a polymer consisting of a chain of organic units joined by carbonate moieties —O—(C=O)—O—. Polycarbonates are typically formed by the reaction between one monomer having at least two hydroxyl functional groups (—OH), and another monomer having at least two chloroformate (—O—(C=O)—Cl) groups. Alternatively, polycarbonates can be formed by the reaction between one monomer having at least two hydroxyl functional groups (—OH) and phosgene (COCl$_2$).

Polyphosphonites

A polyphosphonite is a polymer consisting of a chain of organic units joined by phosphonite links —O—P(R)—O—. Polyphosphonites are typically formed by the reaction between one monomer having at least one dichlorophosphine functional group (—PCl$_2$) and another monomer having at least two alcohol (—OH) groups.

Polyphosphonates

A polyphosphonate is a polymer consisting of a chain of organic units joined by phosphonate links —O—P(=O)(R)—O—. Polyphosphonates are typically formed by the reaction between one monomer having at least one phosphonoyl dichloride functional group (—P(=O)Cl$_2$) and another monomer having at least two alcohol (—OH) groups.

Polyphosphates

A polyphosphate is a polymer consisting of a chain of organic units joined by phosphate links —O—P(=O)(OR)—O—. Polyphosphates are typically formed by the reaction between one monomer having at least one phosphorodichloridate functional group (—O—P(=O)Cl$_2$) and another monomer having at least two alcohol (—OH) groups.

Polyacrylates

Polyacrylates also known as acrylic polymers are polymers with a backbone consisting of entirely of carbon-carbon single bonds formed by radical or anionic polymerization of carbon-carbon double bonds in monomer units of general formulas like CR$_2$=CR—COOR, CR$_2$=CR—CONR$_2$, CR$_2$=CR—CN. Independently, R may be H, F, Cl, Br, I, NO$_2$, CN, optionally substituted alkyl, optionally substituted aryl, —C(=O)-optionally substituted alkyl, —C(=O)-optionally substituted aryl, —C(=O)—O-optionally substituted alkyl, —C(=O)—O-optionally substituted aryl.

Polyethers

For instance, the polymer (P) according to the invention may be based on a polyether. Typically, synthesis of the polyether polymers is via one or more epoxide monomers.

When being a polyether, polymer (P) of the present invention could typically be prepared from a first photoinitiator monomer (A) containing a photoinitiator moiety and an oxirane or an oxetane group and a second dye monomer (B) containing a dye moiety and an oxirane or an oxetane group. The polyether may then be formed by cationic or anionic ring opening co-polymerization of these two monomers with an alkylene oxide or oxetane.

Suitable examples of photoinitiator monomers (A) include 4-glycidyloxybenzophenone, or 1-chloro-4-glycidyloxythioxanthone. Suitable examples of dye monomers (B) are anthraquinone glycidyl ethers e.g. such as are disclosed in U.S. Pat. No. 4,657,842. Suitable examples of alkylene oxides or oxetanes are ethylene oxide, propylene oxide, 1,2-epoxybutane, 2,3-epoxybutane and trimethylene oxide.

In this case, the polymer (P) may have the structure of formula (III):

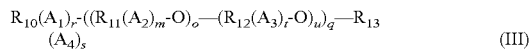

(III)

wherein A$_2$ is a photoinitiator moiety (PI); A$_3$ is a dye moiety (DYE); A$_1$ and A$_4$ are identical or different photoinitiator moieties (PI) or identical or different dye moieties (DYE); R$_{11}$ and R$_{12}$ are independently at each occurrence identical or different, linear or branched alkyl or cycloalkyl groups; R$_{10}$ and R$_{13}$ are independently at each occurrence identical or different, linear or branched alkyl or cycloalkyl groups or aryl groups or are independently at each occurrence selected from H, OH, CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates, polyethylenes, polypropylenes, polyesters, polyamides, polyacrylates and polyurethanes; and m, t, o, u, q, r and s are each independently an integer of from 0-10000, provided that m, t, o, u and q are not zero.

In the above, R$_{11}$ and R$_{12}$ are included in the polyether backbone; hence R$_{11}$ and R$_{12}$ are divalent moieties. The skilled person will understand that e.g. a cycloalkyl moiety being included in the backbone in this manner also may be termed a cycloalkylene. In formula (III) herein, in connection with R$_{11}$ and R$_{12}$, "alkyl" and "cycloalkyl" is to be understood as divalent moieties, which otherwise may be termed "alkylene" and "cycloalkylene", respectively.

In formula (III), R$_{10}$ and R$_{13}$ are independently at each occurrence identical or different, linear or branched alkyl or cycloalkyl groups. R$_{10}$ and R$_{13}$, may be selected from any alkyl group having up to 25 carbon atoms and include both branched and straight chain alkyl groups. Exemplary, non-limiting alkyl groups include methyl, ethyl, propyl, butyl, pentyl, hexyl, heptyl, octyl, nonyl, in the normal, secondary, iso and neo attachment isomers. Exemplary, non-limiting cycloalkyl groups include cyclopropyl, cyclobutyl, cyclopentyl and cyclohexyl.

R$_{10}$ and R$_{13}$ may also be selected from aryl groups, such as any aromatic hydrocarbon with up to 20 carbon atoms. Exemplary, non-limiting aryl groups include phenyl, naphthyl, furanyl, thiophenyl, pyrrolyl, selenophenyl, and tellurophenyl. R$_{10}$ and R$_{13}$ may also be H, OH, CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates. Furthermore, R$_{10}$ and R$_{13}$ may be selected from polymeric entities such as polyacrylates, polyethylenes, polypropylenes, polyesters, polyamides and polyureathanes. The molecular weight of said polymeric entities is typically in the range of 50-500,000 Da. The molecular weight of said polymeric entities may preferably be 50-20,000 Da, e.g. PEG 20,000, and more preferably 50-10,000 Da. For comparison the molecular weight of the entire polymer (P) of formula (III) is typically in a range of 1000-500,000 Da.

The indices m, t, o, u, q, r and s in the general formula (III) represent an average/sum and the formula (III) thereby represents alternating, periodic, statistical/random, block and grafted copolymers. As an example of a random copolymer may be mentioned the copolymer ABAAABAB-BABA having the formula A$_7$B$_5$. In the polymer (P) with the formula (III), A$_1$, A$_2$, A$_3$ and A$_4$ may be linked to R$_{10}$, R$_{11}$, R$_{12}$, and R$_{13}$, respectively, via a spacer group. The spacer group is suitably selected from the group consisting of alkyl, cycloalkyl, aryl, and alkylether groups.

In the second aspect of the invention where polymers (P) are end-functionalized with acryloyl groups the polymer may likewise be based on a polyether, in this case the acryloyl groups, may be the same or different. Where such polyethers are of formula (III), R$_1$ and R$_4$ are the same or different acryloyl groups. The remaining formula (III) and the moieties thereof are otherwise as described above for the first aspect of the invention.

Polystyrene

The polymer (P) may also be based upon a polystyrene. Polystyrene-based polymers may be synthesised via polymerization of the appropriate derivatised styrene, or Friedel-Crafts type reaction of the appropriate polystyrene. This is for example done by cationic, anionic or radical polymerization of at least one monomer like CH$_2$=CH(C$_6$H$_4$(PI)) and at least one monomer like CH$_2$=CH(C$_6$H$_4$)(DYE)), optional with one or more further monomers. PI represent a photoinitiator moiety as described further elsewhere herein, and DYE represent a dye moiety also as described further elsewhere herein. There may independently be one or more PI or DYE moieties on each monomer, these may be the same or different. Additionally, the one or more PI and DYE monomers may each independently be the same or different. In the latter case, an existing polystyrene polymer may be reacted, simultaneously or sequentially, with at least one reagent of the type PI—COCl and at least one reagent of the type DYE-COCl under the conditions of Friedel-Crafts acylation. Accordingly, in one embodiment of the invention the polymer (P) is derived from polystyrene.

Additionally, the polymer (P) may have the structure of formula (IV):

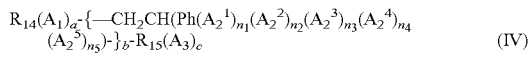
(IV)

wherein $R_{14}$ and $R_{15}$ are each independently selected from polyethylene oxides, polyvinyl pyrrolidones, polyacrylates and polyurethanes; $n_1$ and $n_2$ are real numbers greater than 0 and less than or equal to 5; $n_3$, $n_4$, and $n_5$ are real numbers from 0 to 5; b is an integer from 1-10,000; a and c are each an integer from 0-10,000; $A_1$, $A_3$, $A_2^3$, $A_2^4$ and $A_2^5$ are independently selected from the group consisting of photoinitiator moieties (PI) and dye moieties (DYE); Ph is an optionally-substituted phenyl group; $A_2^1$ comprises a photoinitiator moiety (PI); and $A_2^2$ comprises a dye moiety (DYE). b is suitably an integer from 1-5000, preferably 1-2000. a and c may each be an integer from 0-5000, preferably 0-2000.

The indices a, b and c in the general formula (IV) represent an average/sum and the formula (IV) thereby represents alternating, periodic, statistical/random, block and grafted copolymers. As an example of a random copolymer, may be the copolymer ABAAABABBABA having the formula $A_7B_5$ according to the nomenclature of formula (IV).

Polymers of formula (IV) may for example be prepared by cationic, anionic or radical polymerization of one or more monomers of the formula

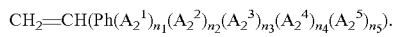

One advantage of using polystyrene-based polymers as polymer (P) is that the phenyl ring of the styrene can be incorporated into the photoinitiator PI. For instance, $A_2^1$— together with Ph—may form an optionally-substituted alkylphenone moiety or an optionally-substituted benzophenone moiety, preferably a substituted or unsubstituted benzophenone moiety.

Additionally, $A_2^1$—together with Ph—may form an optionally-substituted alkylphenone moiety having the structure:

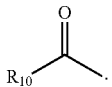

wherein $R_{10}$ is selected from the group consisting of optionally-substituted C1-C25 linear, branched or cyclic alkyl. $R_{10}$ may be selected from the group consisting of optionally-substituted C1-C10 linear, branched or cyclic alkyl, preferably optionally-substituted C1-C5 linear or branched alkyl. $R_{10}$ may be substituted with one or more substituents independently selected from the group consisting of C1-C25 linear, branched or cyclic alkyl, aryl, —OH, —CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates. The substituent on $R_{10}$ may be selected from the group consisting of —OH, —CN, halogens, amines, amides, alcohols, ethers, thioethers, sulfones and derivatives thereof, sulfonic acid and derivatives thereof, and sulfoxides and derivatives thereof.

In the second aspect of the invention where polymers (P) are end-functionalized with acryloyl groups the polymer may likewise be based on a polystyrene, in this case the acryloyl groups, may be the same or different. Where such polystyrenes are of formula (IV), $R_5$ and $R_6$ are the same or different acryloyl groups. The remaining formula (IV) and the moieties thereof are otherwise as described above for the first aspect of the invention.

Polyurethane

The polymer (P) may be based on a polyurethane or preferably a polyurethane co-polymer. Suitably, a polyurethane or a polyurethane co-polymer may be characterized by the monomers it is prepared from. Accordingly, in one embodiment of the invention polymer (P) is a polyurethane or polyurethane co-polymer of at least one monomer (A) comprising a photoinitiator moiety (PI), at least one monomer (B) comprising a dye moiety (DYE), and optionally one or more additional monomers (C, D), wherein each of said monomers have attached two polymerizable functional groups at least two of which are selected to form a urethane bond upon polymerization. As described herein above polyurethanes and co-polymers thereof are typically prepared from alcohol and isocyanate functional groups.

In one embodiment of the invention, polymer (P) is such a polyurethane or polyurethane co-polymer wherein one of the at least one monomer (A) and one of the at least one monomer (B) has two hydroxyl functional groups attached and the other has two isocyanate functional groups attached.

In a specific embodiment of the invention, the at least one monomer (A) is of formula (I) or formula (II) herein.

In another embodiment of the invention, polymer (P) is such a polyurethane co-polymer, which is of at least one monomer (A), at least one monomer (B), at least one monomer (D), and optionally one or more additional monomer (C), wherein monomer (A) has two hydroxyl functional groups attached, monomer (B) has two hydroxyl functional groups attached, and at least one of the one or more monomer (D) has two isocyanate functional groups attached; preferably the at least one monomer (D) may be selected from hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, dicyclohexylmethane diisocyanate, isophorone diisocyanate, 1,4-cyclohexane diisocyanate, 1,3-bis-(isocyanatomethyl) cyclohexane m-tetramethyl xylylene diisocyanate, p-tetramethyl xylylene diisocyanate, 1,4-xylylene diisocyanate, 1,3-xylylene diisocyanate, 4,4'-diphenylmethylene diisocyanate, toluene diisocyanate, their isomers, and naphthalene diisocyanate. Further examples of monomer (D) can be seen from the section "additional components".

In yet a further embodiment of the invention, polymer (P) is such a polyurethane co-polymer which is of at least one monomer (A), at least one monomer (B), at least one monomer (C), and at least one monomer (D), wherein monomer (A) has two hydroxyl functional groups attached, monomer (B) has two hydroxyl functional groups attached, monomer (D) has two isocyanate functional groups attached, and at least one of the one or more monomer (C) has two hydroxyl functional groups attached; such as e.g. selected from the group consisting of polyethylene glycol (PEG), polypropylene glycol (PPG), random and block poly(ethylene glycol)-poly(propylene glycol) copolymers, poly(tetramethylene glycol) (PTMG), poly(1,4-butanediol adipate), poly(ethanediol 1,4-butanediol adipate), poly (caprolacton) diol, poly(1,6-hexanediol carbonate) and poly (ethylene terephthalate) diol; and/or selected from low molecular weight alkylene glycols, diols and combinations thereof. Further examples of monomer (C) can be seen from the section "additional components".

Additionally, polymer (P) may have the structure of formula (V):

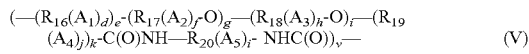

(V)

wherein $R_{17}$, $R_{18}$ and $R_{20}$ can each independently be selected from C1-C25 linear alkyl, C3-C25 branched alkyl, C3-C25 cycloalkyl, aryl and heteroaryl groups such as any aromatic hydrocarbon with up to 20 carbon atoms;

$R_{16}$ and $R_{19}$ are each independently selected from C1-C25 linear alkyl, C3-C25 branched alkyl, C3-C25 cycloalkyl, aryl, heteroaryl, hydrogen, —OH, —CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates, hydrazine, azines, hydrazides, polyethylenes, polypropylenes, polyesters, polyamides, polyacrylates, polystyrenes, and polyurethanes; and when $R_{16}$ and $R_{19}$ are alkyl and aryl groups, they may be substituted with one or more substituents selected from CN, OH, azides, esters, ethers, amides, halogen atoms, sulfones, sulfonic derivatives, $NH_2$ or $Nalk_2$, where alk is any $C_1$-$C_8$ straight chain alkyl group, $C_3$-$C_8$ branched or cyclic alkyl group;

d, f, h, j and l are real numbers, from 0 to 10, provided that the sum of f+h+l is a real number greater than 0;

g and i are real numbers from 0 to 10000;

e and k are real numbers from 0 to 1;

v is an integer from 1 to 10000;

each of $A_1$, $A_2$, $A_3$, $A_4$ and $A_5$ being independently a photoinitiator moiety (PI) or a dye moiety (DYE); provided that:

at least one of $A_1$, $A_2$, $A_3$, $A_4$ and $A_5$ is a photoinitiator moiety (PI); and at least one of $A_1$, $A_2$, $A_3$, $A_4$ and $A_5$ is a dye moiety (DYE).

In formula (V), $R_{16}$ and $R_{19}$ may each be independently selected from C1-C25 linear alkyl, C3-C25 branched alkyl and C3-C25 cycloalkyl.

The indices in the general formula (V) represent an average/sum and the formula (V) thereby represents alternating, periodic, statistical/random, block and grafted copolymers. An example of a random copolymer may be the copolymer ABAAABABAABABAA having the formula $(A_2B_1)_5$ by applying a nomenclature similar to formula (V).

In the second aspect of the invention, where polymers (P) are end-functionalized with acryloyl groups, the polymer may likewise be based on a polyurethane or polyrurethane co-polymer, in this case the acryloyl groups may be the same or different. Where such polyurethane or polyrurethane co-polymer are of formula (V), each end of said polymer (P) is end-functionalized with optionally-substituted acryloyl groups. The remaining formula (V) and the moieties thereof are otherwise as described above for the first aspect of the invention.

Grafted Polymers

The polymer (P) may comprise dye moieties (DYE) and photoinitiator moieties (PI) which are grafted to a polymer. The grafting process begins from a polymer having an X—H bond, and photoinitiator moieties (PI) and dye moieties (DYE) comprising at least one activated alkene functional group. Radical addition of an X—H bond in the polymer takes place across the C═C double bond of the activated alkene functional group(s). X—H is a single bond present in the polymer which can form a radical, typically C—H or N—H. For this reason, in the grafted product, a hydrogen atom H is always present on the second carbon atom from the polymer, which has the formula —CHR—.

Unsaturated reactive photoinitiators of the general formula $CR_2$═CR-Spacer-(PI)$_x$ are suitably chosen from a group consisting of 4-benzoylphenyl acrylate, N-(4-benzoylphenyl)acrylamide, 4-(vinyloxy)benzophenone, 4-(vinylamino)benzophenone, 4-vinylbenzophenone and 1-chloro-4-(acryloyloxy)thioxanthone. Suitable unsaturated reactive dyes are of the general formula $CR_2$═CR-Spacer-(DYE)$_x$. These may for example be aminoanthraquinone dyes disclosed in patent WO2007147742. In these two formulas, x represent that one or more PI or DYE moieties may be attached, R represent a unspecified monovalent group attached to the respective carbon atom, and "Spacer" represent a spacer group between the DYE or PI moiety and the acrylate moiety.

Accordingly, the polymeric photoinitiator may have the structure of Formula (VI):

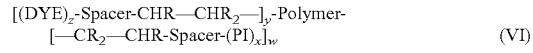

(VI)

wherein y and w are independently integers from 1-5000;

x and z are independently real numbers above 0 and below 5;

PI is a photoinitiator moiety;

DYE is a dye moiety;

and wherein each R group is a substituent independently selected from hydrogen, $C_1$-$C_{25}$ linear alkyl, $C_3$-$C_{25}$ branched alkyl, $C_3$-$C_{25}$ cycloalkyl, aryl, heteroaryl, —OH, —CN, halogens, amines (e.g. —NR'R''', where R' and R''' are alkyl groups, suitably $C_1$-$C_{25}$ alkyl groups) and amides (e.g. —CONR'R''' or R'CONR'''—, where R' and R'' are alkyl groups, suitably $C_1$-$C_{25}$ alkyl groups).

The spacer in Formula (VI) is suitably selected from the group consisting of a single bond, $C_1$-$C_{25}$ linear alkylene, $C_3$-$C_{25}$ branched alkylene, $C_3$-$C_{25}$ cycloalkylene, arylene, heteroarylene, amines, amides, alcohols, ethers, esters, thioethers, sulfones and derivatives thereof, sulfonic esters and derivatives thereof, sulfoxides and derivatives thereof and carbonates, ketones and esters. Preferably, the spacer is selected from the group consisting of $C_1$-$C_{25}$ linear alkylene, $C_3$-$C_{25}$ branched alkylene, $C_3$-$C_{25}$ cycloalkylene, and esters.

The spacer in Formula (VI) may be a polymeric entity. The spacer may be selected from the group consisting of polyolefines, polyacrylates, polyurethanes, polyesters, polyamides, polydialkylsiloxanes, polyalkyloxides or various copolymers comprising blocks or repeatable units of the mentioned polymers. If polymeric, the spacer may have a molecular weight in the range of 50-500,000 Da.

In the second aspect of the invention, where polymers (P) are end-functionalized with acryloyl groups, this may likewise be based on a grafted polymer, in this case the acryloyl groups may be the same or different. Where such grafted polymers are of formula (VI), each end of said polymer (P) is end-functionalized with optionally-substituted acryloyl groups. The remaining formula (VI) and the moieties thereof are otherwise as described above for the first aspect of the invention.

Solubility and Quaternary Moieties

Ideally, for environmental and economical reasons, inks for ink-jet printers should be based on aqueous solvents. Therefore, the polymer (P) is preferably water-dispersible or water-soluble, most preferably water-soluble.

There are a number of ways in which water-solubility may be achieved. One way is to chemically derivatize the polymer (including the photoinitiator moiety and the dye moiety)

so that it includes functional groups which promote water-solubility. Examples of such functional groups include carboxylate groups, sulfonic acids (from sulfonation of the polymer, particularly of aryl groups in the polymer) and quaternary ammonium (from quaternisation of amine functional groups in the polymer).

In particular, functional groups which promote water-solubility are cationic moieties. By "cationic moiety" is meant a functionality having a positive charge. Suitable cationic moieties are selected from quaternary ammonium moieties, quaternary phosphonium moieties, sulfonium moieties, guanidinium moieties and thiouronium moieties.

Preferred are quaternary ammonium moieties and quaternary phosphonium moieties. Most preferred are quaternary ammonium moieties. Suitable counterions for the cationic moieties are Cl$^-$, Br$^-$, I$^-$, $^-$OAc, $^-$OTs (tosylate), $^-$OMs (mesylate), $^-$OTf (triflate), and $^-$ONf (nonaflate). In a preferred embodiment of the invention the counterion for such quaternary ammonium moieties are selected from Cl$^-$, Br$^-$, I$^-$. Alternatively, I$^-$, $^-$OAc, $^-$OTs, $^-$OMs, $^-$OTf, and $^-$ONf are preferred The photoinitiator moieties may be bound to the polymer via said cationic moieties. Quaternisation chemistry may be used to connect the photoinitiator moieties to the polymer. Accordingly, polymers covalently linked to photoinitiators via a cationic moiety are readily synthesised via one of two methods. The first method comprises the steps of
  a. providing a polymer comprising one or more amine or phosphine moieties;
  b. providing a photoinitiator comprising one or more leaving groups; and
  c. reacting said polymer from step a. with the photoinitiator from step b. such that a plurality of photoinitiator moieties become covalently linked to said polymer via quaternary ammonium or quaternary phosphonium moieties.

The second method comprises the steps of:
  a. providing a polymer comprising one or more leaving groups;
  b. providing a photoinitiator comprising one or more amine or phosphine moieties; and
  c. reacting said polymer from step a. with the photoinitiator from step b. such that a plurality of photoinitiator moieties become covalently linked to said polymer via quaternary ammonium or quaternary phosphonium moieties.

Due to ease of synthesis, and the availability of polymers comprising one or more amine or phosphine moieties, the first method is preferred.

Suitably, the reaction in step c. of either method is a nucleophilic substitution reaction by the one or more amine or phosphine moieties, thus displacing the one or more leaving groups. In this way, quaternary ammonium or quaternary phosphonium moieties are formed by the reaction. A "leaving group" is in relation to these methods is defined as a part of a molecule which—upon reaction with a nucleophile separates from said molecule. Suitably, the leaving groups in each method are selected from Cl, Br, I, OAc, OTs (tosylate), OMs (mesylate), OTf (triflate), and ONf (nonaflate). Of these, I, OAc, OTs, OMs, OTf, and ONf are preferred.

More than one photoinitiator moiety, such as 2 or 3 photoinitiator moieties can be linked to the polymer via one cationic moiety.

Additional embodiments of the invention including quaternary ammonium groups for included in a monomer (A) comprising a PI moiety will be described herein below.

Another way to increase water-solubility is to simply lower the molecular weight of the polymer. PEG, for example, is soluble in an equivalent amount of water (50%, w/w) at a molecular weight of 35,000, but this solubility falls slightly with increasing molecular weight.

Another way to increase water-solubility is to use hydrophilic additional monomers. Examples of suitable hydrophilic monomers include 2-hydroxyethyl(meth)acrylate (HEMA), 2-hydroxypropyl(meth)acrylate, 3-hydroxypropyl(meth)acrylate, 2,3-dihydroxypropyl(meth)acrylate, 4-hydroxybutyl(meth)acrylate, N-vinyl caprolactam, N-vinyl acetamide, N-vinyl pyrrolidone, acrylonitrile, tetrahydrofurfuryl acrylate, acrylamide, mono- and di-N-alkyl substituted acrylamide, (meth)acrylic acid, itaconic acid, beta-carboxyethyl acrylate, glycerol methacrylate, 2-(dimethylamino)ethyl methacrylate (DMAEMA), vinyl alcohol, polyethylene glycol, and combinations thereof. Most suitably, hydrophilic additional monomers may be polyethylene glycol, N-vinyl pyrrolidone, vinyl alcohol, 2-hydroxyethyl (meth)acrylate (HEMA) or 2-(dimethylamino)ethyl methacrylate (DMAEMA).

One property of the polymer which could prevent degradation of the dye is the crystallinity of the polymeric system. A highly crystalline polymer should be less prone to oxygen and ozone diffusion, and thereby retain the colour of the printed surface better than, for example, a polymeric dye based on a purely amorphous polymer. Alternatively, aggregation-promoting functional groups on the polymer may also promote a low oxygen and ozone diffusion into the coated surface.

End-Functionalized Polymer (P)

The polymer (P) has at least two ends, where the polymer chain terminates. In the second aspect of the present invention, each end of said polymer (P) is end-functionalized with optionally-substituted acryloyl groups. If branched, the polymer (P) may have more than two ends, however, in a preferred aspect; the polymer (P) has two ends, each of said ends being functionalized with one acryloyl group.

As set out above, "acryloyl" means the functional group with structure $CR_2$=CR—C(=O)—, such as e.g. $H_2C$=CH—C(=O)—. In other words, each and every end of the polymer (P) terminates with a group that includes the following moiety: $CR_2$=CR—C(=O)—, such as e.g. $H_2C$=CH—C(=O)—. The group R in this case may be selected from —F, —Cl, —Br, —I, —CN, —NO$_2$, —C$_1$-C$_6$ alkyl, aryl and —C(O)—O—(C$_1$-C$_6$ alkyl).

Suitably, the acryloyl groups are selected from the group consisting of: acrylate ($H_2C$=CH—C(=O)—O—), methacrylate (CH$_3$—HC=CH—C(=O)—O—), acrylamide ($H_2C$=CH—C(=O)—NH—) and α,β-unsaturated ketones ($H_2C$=CH—C(=O)—C), all of which may be optionally substituted by replacement of a hydrogen atom H with a substituent.

The acryloyl groups may in some instances be selected from the group consisting of: acryloyl ($H_2C$=CH—C(=O)—), methacryloyl (CH$_2$=C(CH$_3$)—C(=O)—), acrylamide ($H_2C$=CH—C(=O)—NH—) and α,β-unsaturated ketones ($H_2C$=CH—C(=O)—C), all of which may be optionally substituted by replacement of a hydrogen atom H with a substituent.

In a preferred embodiment of the invention, the acryloyl groups are selected from the group consisting of acryloyl ($H_2C$=CH—C(=O)—), methacryloyl (CH$_2$=C(CH$_3$)—C(=O)—)—cis- or trans-cinnamoyl (C$_6$H$_5$—CH=CH—C(=O)—), maleinyl (cis-ROOC—CH=CH—C(=O)—), and fumaroyl (trans-ROOC—CH=CH—C(=O)—), all of which may be optionally substituted by replacement of a hydrogen atom H with a substituent. Preferably, the acryloyl groups may be unsubstituted. In a preferred embodiment the acryloyl group is acryloyl or methacryloyl.

End-functionalization may take place via any known method. In particular, end-functionalization with acryoyl groups preferably takes place through ester or amide bond formation, when the polymer is terminated with a hydroxyl group or an amino group, respectively.

The acryloyl groups on the polymer (P) may be the same or different. Preferably, for ease of synthesis, all acryloyl groups on the polymer (P) are the same.

In structural terms, the end-functionalized polymer (P) may be described as having the general structure:

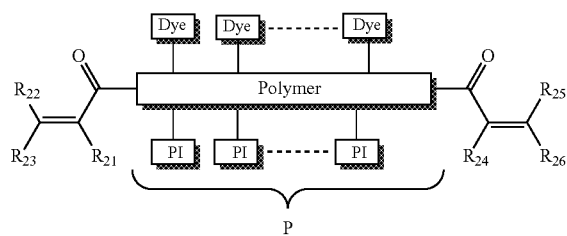

The acryloyl groups can be substituted with various groups, as indicated by $R_{21}$, $R_{22}$, $R_{23}$, $R_{24}$, $R_{25}$ and $R_{26}$. $R_{21}$, $R_{22}$, $R_{23}$, $R_{24}$, $R_{25}$ and $R_{26}$ can independently be selected from $C_1$-$C_6$ linear, branched or cyclic alkyl, alkylene, heterocyclyl, aryl, —OH, —CN, —NO$_2$, halogens, amines, amides, alcohols, ethers (such as polyalkylether groups), thioethers, sulfones and derivatives thereof, sulfoxides and derivatives thereof, carbonates, isocyanates, nitrates and acrylates. Preferably $R_{21}$-$R_{26}$ may independently be selected from H or $CH_3$, more preferably all of $R_{21}$-$R_{26}$ may be H.

Further details and preferred embodiments regarding polymer (P) of the second aspect of the invention are as described in relation to polymer (P) of the first aspect of the invention mutatis mutandis.

Photoinitiator Moiety (PI)

In the present invention, a photoinitiator is defined as a moiety which, on absorption of light, generates reactive species (ions or radicals) and initiates one or several chemical reactions or transformation. One preferred property of the photoinitiator is good overlap between the UV light source spectrum and the photoinitiator absorption spectrum. Another desired property is a minor or no overlap between the photoinitiator absorption spectrum and the intrinsic combined absorption spectrum of the other components in the matrix composition.

Suitably, the photoinitiator moieties are pendant on the polymer. This means that they are attached to the polymer at points other than at the polymer ends. The photoinitiator moieties suitably constitute 0.01-50% by weight, such as 0.05-20% by weight, preferably 0.5-15% by weight and more preferably 1-12% by weight.

The polymers of the present invention have the advantage of allowing for the presence of more than one or two photoinitiator moieties to be covalently linked to each of the polymers. In a preferred embodiment of the invention, at least three photoinitiator moieties (PI) and at least three dye moieties (DYE) are pendant on the polymer chain, such as e.g. four, five, six, seven or more. This to emphasize that a plurality of photoinitiator and dye moieties may be covalently linked along the length of the polymer chain as opposed to being end-functionalized, and hence limited by the number of ends on each polymer, which usually is two.

The photoinitiator moieties of the invention may independently be cleavable (Norrish Type I) or non-cleavable (Norrish Type II). Upon excitation, cleavable photoinitiator moieties spontaneously break down into two radicals, at least one of which is reactive enough to abstract a hydrogen atom from most substrates. Benzoin ethers (including benzil dialkyl ketals), phenyl hydroxyalkyl ketones and phenyl aminoalkyl ketones are important examples of cleavable photoinitiator moieties. The photoinitiator moieties of the invention are efficient in transforming light from the UV or visible light source to reactive radicals which can abstract hydrogen atoms and other labile atoms from polymers and hence effect covalent cross-linking. Optionally, amines, thiols and other electron donors can be either covalently linked to the polymeric photoinitiator or added separately or both. The addition of electron donors is not required but may enhance the overall efficiency of cleavable photoinitiators according to a mechanism similar to that described for the non-cleavable photoinitiators below.

Suitably, the photoinitiator moieties of the invention are all non-cleavable (Norrish Type II). For reference, see e.g. A. Gilbert, J. Baggott: "Essentials of Molecular Photochemistry", Blackwell, London, 1991). Non-cleavable photoinitiator moieties do not break down upon excitation, thus providing fewer possibilities for the leaching of small molecules from the matrix composition. Excited non-cleavable photoinitiators do not break down to radicals upon excitation, but abstract a hydrogen atom from an organic molecule or, more efficiently, abstract an electron from an electron donor (such as an amine or a thiol). The electron transfer produces a radical anion on the photoinitiator and a radical cation on the electron donor. This is followed by proton transfer from the radical cation to the radical anion to produce two uncharged radicals; of these the radical on the electron donor is sufficiently reactive to abstract a hydrogen atom from most substrates. Benzophenones and related ketones such as thioxanthones, xanthones, anthraquinones, fluorenones, dibenzosuberones, benzils, and phenyl keto-coumarins are important examples of non-cleavable photoinitiators. Most amines with a C—H bond in α-position to the nitrogen atom and many thiols will work as electron donors. The photoinitiator moieties of the invention are preferably non-cleavable. The advantage of using Type II as opposed to Type I photoinitiators is fewer generated by-products during photoinitiated reactions. As such, benzophenones are widely used. When for example α-hydroxyalkyl-phenones dissociate in a photoinitiated reaction, two radicals are formed, which can further dissociate and possibly form loosely bound unwanted aromatic by-products.

Self-initiating photoinitiator moieties are within the scope of the present invention. Upon UV or visible light excitation, such photoinitiators predominantly cleave by a Norrish type I mechanism and cross-link further without any conventional photoinitiator present, allowing thick layers to be cured. Recently, a new class of β-keto ester based photoinitiators has been introduced by M. L Gould, S. Narayan-Sarathy, T. E. Hammond, and R. B. Fechter from Ashland Specialty Chemical, USA (2005): "Novel Self-Initiating UV-Curable Resins: Generation Three", Proceedings from RadTech Europe 05, Barcelona, Spain, Oct. 18-20 2005, vol. 1, p. 245-251, Vincentz. After base-catalyzed Michael addition of the ester to polyfunctional acrylates, a network is formed with a number of quaternary carbon atoms, each with two neighbouring carbonyl groups.

Another self-initiating system based on maleimides has also been identified by C. K. Nguyen, W. Kuang, and C. A. Brady from Albemarle Corporation and Brady Associates LLC, both USA (2003): "Maleimide Reactive Oligomers", Proceedings from RadTech Europe 03, Berlin, Germany, Nov. 3-5, 2003, vol. 1, p. 589-94, Vincentz. Maleimides initiate radical polymerization mainly by acting as non-cleavable photoinitiators and at the same time spontaneously polymerize by radical addition across the maleimide double bond. In addition, the strong UV absorption of the maleimide disappears in the polymer, i.e. maleimide is a photobleaching photoinitiator; this could make it possible to cure thick layers.

So, in an embodiment of the invention, the photoinitiator moieties include at least two different types of photoinitiator moieties. Preferably, the absorbance peaks of the different photoinitiators are at different wavelengths, so the total amount of light absorbed by the system increases. The different photoinitiators may be all cleavable, all non-cleavable, or a mixture of cleavable and non-cleavable. A blend of several photoinitiator moieties may exhibit synergistic properties, as is e.g. described by J. P. Fouassier: "Excited-State Reactivity in Radical Polymerization Photoinitiators", Ch. 1, pp. 1-61, in "Radiation curing in Polymer Science and technology", Vol. II ("Photo-initiating Systems"), ed. by J. P. Fouassier and J. F. Rabek, Elsevier, London, 1993. Briefly, efficient energy transfer or electron transfer takes place from one photoinitiator moiety to the other in the pairs [4,4'-bis(dimethyl-amino)benzophenone+benzophenone], [benzophenone+2,4,6-trimethylbenzophenone], [thioxanthone+methylthiophenyl morpholinoalkyl ketone].

Furthermore, it has recently been found that covalently linked 2-hydroxy-1-(4-(2-hydroxyethoxy)phenyl)-2-methylpropan-1-one, which is commercially available with the trade name Irgacure 2959, and benzophenone in the molecule 4-(4-benzoylphenoxyethoxy)phenyl 2-hydroxy-2-propyl ketone gives considerably higher initiation efficiency of radical polymerization than a simple mixture of the two separate compounds, see S. Kopeinig and R. Liska from Vienna University of Technology, Austria (2005): "Further Covalently Bonded Photoinitiators", Proceedings from RadTech Europe 05, Barcelona, Spain, Oct. 18-20, 2005, vol. 2, p. 375-81, Vincentz. This shows that different photoinitiator moieties may show significant synergistic effects when they are present in the same oligomer or polymer.

Each and every one of the above-discussed types of photoinitiators and photoinitiator moieties may be utilised as photoinitiator moieties in the polymeric photoinitiators of the present invention.

The polymer (P) according to the invention may comprise a photoinitiator moiety (PI) which is a benzophenone having the general formula:

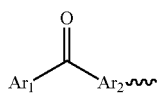

wherein $Ar_1$ and $Ar_2$ are independently selected from the same or different optionally substituted aryl. The wavy line represents the attachment point to the polymer or to the polymer via a linker moiety, e.g. Z of Formula (I) or (II) herein below.

Photoinitiator moieties may be selected from the group consisting of benzoin ethers, phenyl hydroxyalkyl ketones, phenyl aminoalkyl ketones, benzophenones, thioxanthones, acridones, anthraquinones, fluorenones, dibenzosuberones, benzils, benzil ketals, α-dialkoxy-acetophenones, α-hydroxy-alkyl-phenones, α-amino-alkyl-phenones, acyl-phosphine oxides, phenyl ketocoumarins, silane, maleimides, and derivatives thereof. The group can also consist of derivatives of the photoinitiator moieties listed.

The photoinitiator moieties may be selected from the group consisting of benzoin ethers, phenyl hydroxyalkyl ketones, phenyl aminoalkyl ketones, benzophenones, thioxanthones, xanthones and derivatives thereof. The group can also consist of derivatives of the photoinitiator moieties listed. Preferred photoinitiator moieties may be selected from benzophenones, thioxanthones, benzilketals and phenyl hydroxyalkyl ketones, such as 2-hydroxy-2-methyl-1-phenylpropan-1-ones. More preferred photoinitiator moieties may be selected from benzophenones, and thioxanthones. Benzophenones are the most-preferred photoinitiator moieties.

Instances of the above formula wherein either or both of $Ar_1$ and $Ar_2$ are substituted in the ortho- or para-position with —OH or —$NH_2$ are known as UV absorbers, giving too low triplet quantum yields ($\Phi_T$) for use as photoinitiators for practical purposes. Additionally, secondary amines (—NH—R) in the ortho- or para-position gives low triplet quantum yields in polar solvents, being less efficient photoinitiators (see Singh et al. J. Phys. Chem. A 104, 2000, 7002; Suppan et al. J. Photochem. Photobiol. A 94, 1996, 145.). Accordingly, photoinitiator moieties PI and Pi in general formula (I) herein does not include compounds of the above formula having one or more —OH or —$NH_2$ groups in the ortho- or para-position of the aryl rings. Additionally, in one embodiment of the invention, photoinitiators of the above formula does not have a secondary amine (—NHR, where R e.g. is an alkyl group) in the ortho- or para-position of the aryl rings.

Benzophenones are well-studied, commercially-available photoinitiator moieties, and their UV absorption can be tailored according to the substitution pattern of the aryl groups. Preferred substituents on $Ar_1$ and $Ar_2$ are electron-donating groups or atoms such as N, O and S. Such substituents provide UV absorption at a longer wavelength, meaning that LED lamps can be used as a UV source. LED lamps provide advantages such as low energy consumption and generate less heat; thus the substrate temperature can be controlled more accurately. Accordingly, in a preferred embodiment of the invention, $Ar_1$ and $Ar_2$ may each independently be optionally substituted with one or more electron-donating groups or atoms; more preferably such one or more substituents, e.g. one, two, three or four substituents, may be selected from the group consisting of —$CH_3$, —$CH_2CH_3$, —$CH_2CH_2CH_3$, —$CH(CH_3)_2$, —$C_6H_5$, —$OCH_3$, —$OCH_2CH_3$, —$OCH_2CH_2CH_3$, —$OCH(CH_3)_2$, —$OC_6H_5$, —$SCH_3$, —$SCH_2CH_3$, —$SCH_2CH_2CH_3$, —$SCH(CH_3)_2$, —$SC_6H_5$, —$N(CH_3)_2$, —$N(CH_2CH_3)_2$, and —$N(CH_2CH_2OCH_2CH_2)_2$.

The polymer (P) may comprise two or more different photoinitiator moieties (PI).

The photoinitiator moiety (PI) in the polymer (P) may be derived from a first monomer comprising the photoinitiator moiety, and incorporated into the polymer upon polymerization (according to the method described below). Alternatively, the photoinitiator moiety may be formed by grafting it onto a polymer.

Photoinitiator moieties (PI) absorb radiation in the UV portion of the spectrum so as to form radicals. This distinguishes them from dye moieties (DYE), as dye moieties do not form radicals upon exposure to radiation. Instead, dye moieties absorb radiation and convert it to another form of energy. The different response of photoinitiator moieties and dye moieties to irradiation is well characterized in the literature.

Radicals derived from the photoinitiator moieties are not usually stable radicals, and usually extract protons (H) from neighbouring molecules. The radicals thus formed then cross-link.

To ensure good absorption of radiation from the UV source, the photoinitiator moiety (PI) suitably has an absorption of between 200-500 nanometers, preferably between 250 and 450 nm, more preferably between 300 and 400 nm.

Monomer (A)

In some instance of the present invention, the first monomer (A) may have a structure represented by formula (I):

in which, Pi is a photoinitiator moiety;
Z is a linker moiety;
$X_1$ and $X_2$ are independently selected from optionally substituted $C_1$-$C_{12}$ alkylene, optionally substituted $C_1$-$C_{12}$ alkenylene; optionally substituted heterocyclyl; —O—; —S—; —NR$^3$—, —C(=O)—; —C(=NR$^3$)—; —Si(R$^3$)$_2$—O—; optionally substituted aryl; and combinations thereof,
wherein R$^3$ is H or optionally substituted $C_1$-$C_{12}$ alkyl;
wherein $X_1$ and $X_2$ or a part thereof may be linked to one another or to Z to form one or more ring structures;
wherein Z, $X_1$ and $X_2$ are selected such that N is a tertiary amine; and
wherein $W_1$ and $W_2$ are functional groups independently selected from alcohol; primary amine; secondary amine; thiol; alkoxy silane; silane esters of carboxylic acids; isocyanate; isothiocyanate; carboxylic acid; chloroformate; primary amide; secondary amide; urethane or urea groups.

The particular structure of the photoinitiator allows it to be incorporated as a monomer into a polyurethane polymer, while initiating polymerization by means of the photoinitiator moiety Pi. In addition, photoinitiators having the general formula (I), wherein Z is selected so that the N-atom of formula (I) is a tertiary amine, are able to at least partially replace nucleophilic low molecular weight amine catalysts (e.g. DABCO) in polyurethane polymerization processes. Accordingly, in a preferred embodiment of formula (I) Z, $X_1$ and $X_2$ are selected such that N is a tertiary amine.

As the monomers of Formula (I) encompass a tertiary amine, the number of additives used in the polymerization process can further be minimized, which again minimizes the number of chemical used and the therewith associated potential leaching problems. Polymer (P) of the invention having incorporated monomers of Formula (I) are hereby specially suited for medical purposes where special considerations in this regard are to be made, both in relation to patient health and regulatory approvals.

It has been found by the present inventors that the inbuilt tertiary amine of the photoinitiator may function as a catalyst in the polymerization reaction connecting the photoinitiators of formula (I) as a monomer with one or more further monomers (e.g. monomer (A) and (B) as described herein). Hereby making the addition of such a catalyst unnecessary, and limiting the potential migration of byproducts or co-reagents from a final product.

Additionally, in a UV photocrosslinking of a linear polymer chain, the inbuilt tertiary amine will in a UV photocrosslinking of a linear polymer chain function as an "amine synergist" for the photoinitiator moiety (Pi). When the Pi absorbs UV light and undergoes transition to an excited state and then forms a radical this may be transferred to a carbon atom adjacent to the inbuilt tertiary amine. The hereby formed radical will then react with a similar group another place in the polymer and form the cross-linking.

When monomers (A) of formula (I) comprise only two end groups $W_1$ and $W_2$ capable of taking part in a particular polymerization reaction, the monomer of formula (I) will be incorporated in the polymer backbone with the photoinitiator as a pendant group via the linkers Z, branching of the polymer is additionally avoided. In one embodiment of the invention, it is therefore preferred to avoid that other functional groups being capable of participating in the desired polymer reaction are present in the monomers. This is for instance relevant in connection with the presence of optional substituents on the different moieties present in the monomers of formula (I).

The at least one monomer (A) used in the formation of polymer (P) may be one type of monomer (A) or it may be two or more different types of monomer (A). For example when two or more monomers of formula (I) are used these may be fully identical or one or more of the moieties may vary, such as e.g. the Pi moieties may vary, or the Z linker may vary.

Linker, Z

The portion of the photoinitiator of Formula (I) indicated by Z is a linker moiety. The linker Z acts to both bind the photoinitiator moiety to the polyurethane backbone, and simultaneously hold the photoinitiator at a certain distance from the backbone. Linker Z therefore has two ends. At one end, therefore, Z is joined to the photoinitiator moiety; at the other end, Z is joined to the N-atom of formula (I), which becomes part of the polyurethane backbone when the monomer is polymerized with one or more monomer (B).

The size of the linker Z is selected according to the desired properties of the photoinitiator. A short linker Z will provide most opportunity for interaction between the amine group N and the photoinitiator moiety. For example, if Z is a single bond, the amine group N will be directly bound to the photoinitiator moiety, providing a potential for stabilisation of the photoinitiator moiety in its radical form. On the other hand, a long linker Z will provide freer movement of the photoinitiator moiety in the polymerization process, which also provides advantages. A rigid structure may lower the possibility that radicals formed at one site propagate to polymer chains in the vicinity of the photoinitiator, whereas a "loose" structure could facilitate dispersion of radical functionalities over a wider area. Suitably, the linker Z has a molecular weight of less than 10000 Da, suitably less than 5000 Da, most suitably less than 1000 Da. The linker Z preferably comprises no more than 50 atoms, preferably no more than 30 atoms.

By excluding secondary amines from the —Z— linker, the linker will not participate in the polymer reaction. I.e. if such secondary amines were present they could for example form undesired polyurea bonds, during a polyurethane polymerization reaction leading to undesirable cross-linking, when a linear polymer chain is desirable. In the same manner, it is advantageous to avoid such secondary amines in substituents on the linker or on other R groups in the monomer.

Accordingly, in one embodiment of the invention Z may preferably be selected from the group consisting of a single bond, optionally substituted $C_1$-$C_{12}$ alkylene, optionally substituted $C_2$-$C_{12}$ alkenylene, —O—, —S—, —NR$^2$—, —C(=O)—, —C(=O)—NR$^1$—, —NR$^1$—C(=O)—, —C(=NR$^1$)—, —SO$_2$—, —P(=O)(OR$^1$)—, optionally substituted —C$_3$-C$_8$ cycloalkyl, optionally substituted heterocyclyl, optionally substituted aryl, —[O—(C$_1$-C$_{12}$ alkylene)]$_n$-, —[NR$^2$—(C$_1$-C$_{12}$ alkylene)]$_n$, —[S—(C$_1$-C$_{12}$ alkylene)]$_n$-, and combinations thereof, wherein R$^1$ is H or optionally substituted C$_1$-C$_{12}$ alkyl; R$^2$ is optionally substituted C$_1$-C$_{12}$ alkyl, and n is an integer from 1-20. By R$^1$ being different from R$^2$ secondary amines in the linker are avoided.

Z may be selected from a single bond, optionally substituted C$_1$-C$_{12}$ alkylene, optionally substituted C$_2$-C$_{12}$ alkenylene, —O—, —S—, —NR$^2$—, —C(=O)—, —C(=O)—NR$^1$—, —NR$^1$—C(=O)—, —C(=NR$^1$)|, optionally substituted —C$_3$-C$_8$ cycloalkyl, optionally substituted heterocyclyl, optionally substituted aryl, —[O—(C$_1$-C$_{12}$ alkylene)]$_n$—, —[NR$^2$—(C$_1$-C$_{12}$ alkylene)]$_n$, —[S—(C$_1$-C$_{12}$ alkylene)]$_n$—, and combinations thereof, wherein R$^1$ is H or optionally substituted C$_1$-C$_{12}$ alkyl; R$^2$ is optionally substituted C$_1$-C$_{12}$ alkyl, and n is an integer from 1-20.

Alternatively, Z may be selected from a single bond, optionally substituted C$_1$-C$_6$ alkylene, optionally substituted C$_2$-C$_6$ alkenylene, —O—, —S—, —NR$^2$—, —C(=O)—, —C(=O)—NR$^1$—, —NR$^1$—C(=O)—, —C(=NR$^1$)—, optionally substituted —C$_3$-C$_6$ cycloalkyl, optionally substituted heterocyclyl, optionally substituted aryl, —[O—(C$_1$-C$_6$ alkylene)]$_n$-, —[NR$^2$—(C$_1$-C$_6$alkylene)]$_n$-, —[S—(C$_1$-C$_6$ alkylene)]$_n$-, and combinations thereof; preferably from optionally substituted C$_1$-C$_6$ alkylene, —NR$^2$—, —C(=O)—, —[O—(C$_1$-C$_6$ alkylene)]$_n$-, —[NR$^2$—(C$_1$-C$_6$ alkylene)]$_n$-; wherein R$^1$ is H or optionally substituted C$_1$-C$_6$ alkyl, R$^2$ is optionally substituted C$_1$-C$_6$ alkyl, and n is an integer from 1-6, preferably 1-2.

In a specific embodiment of the invention, Z is a single bond.

Specifically, Z may be selected from C$_1$-C$_6$ alkylene, C$_2$-C$_6$ alkenylene, —NR$^2$—, —C(=O)—(C$_1$-C$_6$ alkylene)-, —C(=O)—O—(C$_1$-C$_6$ alkylene)-, —C(=O)—NR$^1$—(C$_1$-C$_6$ alkylene), —C$_3$-C$_6$ cycloalkyl, aryl, heterocyclyl, —[O—(C$_1$-C$_6$ alkylene)]$_n$-, —[(C$_1$-C$_6$ alkylene)-O—(C$_1$-C$_6$ alkylene)]$_n$-, —[NR$^2$—(C$_1$-C$_6$ alkylene)]$_n$, and —[S—(C$_1$-C$_6$ alkylene)]$_n$-, wherein R$^1$ is H or optionally substituted C$_1$-C$_6$ alkyl, R$^2$ is optionally substituted C$_1$-C$_6$ alkyl, n is an integer from 1-2, and wherein any C$_1$-C$_6$ alkylene, C$_2$-C$_6$ alkenylene, —C$_3$-C$_6$ cycloalkyl, aryl or heterocyclyl each independently is optionally substituted.

More specifically Z may be selected from C$_1$-C$_6$ alkylene, C$_2$-C$_6$ alkenylene, —NR$^2$—, —C(=O)—(C$_1$-C$_6$ alkylene)-, —C(=O)—NR$^1$—, —C(=O)—O—(C$_1$-C$_6$ alkylene)-, —C(=O)—NR$^1$—(C$_1$-C$_6$ alkylene), —[O—(C$_1$-C$_6$ alkylene)]$_n$-, —[(C$_1$-C$_6$ alkylene)-O—(C$_1$-C$_6$ alkylene)]$_n$-, —[NR$^2$—(C$_1$-C$_6$ alkylene)]$_n$, and —[S—(C$_1$-C$_6$ alkylene)]$_n$-, wherein R$^1$ is H or optionally substituted C$_1$-C$_6$ alkyl, R$^2$ is optionally substituted C$_1$-C$_6$ alkyl, n is an integer from 1-2, and wherein any C$_1$-C$_6$ alkylene, C$_2$-C$_6$ alkenylene, aryl or heterocyclyl each independently is optionally substituted.

Z may be selected from a single bond, optionally substituted C$_1$-C$_{12}$ alkylene, optionally substituted C$_1$-C$_{12}$ alkenylene; —O—; —S—; —NR$^1$—, —C(=O)—; —C(=NR$^1$)—; optionally substituted heterocyclyl; optionally substituted aryl; —[O—(C$_1$-C$_{12}$ alkylene)]$_n$-, —[NHR$^1$—(C$_1$-C$_{12}$ alkylene)]$_n$; —[S—(C$_1$-C$_{12}$ alkylene)]$_n$-; and combinations thereof, wherein R$^1$ is H or optionally substituted C$_1$-C$_{12}$ alkyl and n is an integer from 1-20.

Suitably, n is an integer from 1-10, more suitably from 1-5, such as e.g. 1, 2, 3, 4 or 5.

R$^1$ may also be optionally substituted C$_1$-C$_6$ alkyl, such as e.g. methyl, ethyl, propyl, butyl, pentyl or hexyl. R$^1$ may be straight-chain, branched or cyclic alkyl. R$^1$ may be H. R$^2$ may be optionally substituted C$_1$-C$_6$ alkyl, such as e.g. methyl, ethyl, propyl, isopropyl, butyl, isobutyl, pentyl, or isopentyl.

Photoinitiator monomers (A) of Formula (I) in which Z comprises an electron-donating group adjacent Pi are advantageous, as this provides opportunities to tailor the UV absorption of the photoinitiator moiety. Accordingly, Z may also be selected from optionally substituted —O—(C$_1$-C$_{12}$ alkylene)-, preferably optionally substituted —O—(C$_1$-C$_6$ alkylene)-, optionally substituted —S—(C$_1$-C$_{12}$ alkylene)-, preferably optionally substituted —S—(C$_1$-C$_6$ alkylene)-, and optionally substituted —NR$^2$—(C$_1$-C$_{12}$ alkylene)-, preferably optionally substituted —NR$^2$—(C$_1$-C$_6$ alkylene)-; wherein R$^2$ is optionally substituted C$_1$-C$_{12}$ alkyl, preferably C$_1$-C$_6$ alkyl. Z may even be selected from optionally substituted —O—(C$_1$-C$_{12}$ alkylene)-, preferably optionally substituted —O—(C$_1$-C$_6$ alkylene)-.

Most preferably, Z is selected from a bond, optionally substituted C$_1$-C$_6$ alkylene and optionally substituted —O—(C$_1$-C$_6$ alkylene)-.

In that Z may comprise a combination of the above-mentioned groups, the invention encompasses photoinitiators in which Z is made up of two or more of the above-mentioned groups in series, e.g.

—O—(C$_1$-C$_{12}$ alkylene)-
—(C$_1$-C$_{12}$ alkylene)-O—(C$_1$-C$_{12}$ alkylene)-
—O—(C$_1$-C$_{12}$ alkylene)-O—(C$_1$-C$_{12}$ alkylene)-
—O—(C$_1$-C$_{12}$ alkylene)-O-(aryl)-
—NR$^1$—(C$_1$-C$_{12}$ alkylene)-
—(C$_1$-C$_{12}$ alkylene)-NR$^1$—(C$_1$-C$_{12}$ alkylene)-
—NR$^1$—(C$_1$-C$_{12}$ alkylene)-NR$^1$—(C$_1$-C$_{12}$ alkylene)-
—NR$^1$—(C$_1$-C$_{12}$ alkylene)-O—(C$_1$-C$_{12}$ alkylene)
—O—(C$_1$-C$_{12}$ alkylene)-NR$^1$—(C$_1$-C$_{12}$ alkylene)-
—C(=O)—O—(C$_1$-C$_{12}$ alkylene)-
—C(=O)—NR$^1$—(C$_1$-C$_{12}$ alkylene)-
—O—C(=O)—(C$_1$-C$_{12}$ alkylene)-
—N—C(=O)—(C$_1$-C$_{12}$ alkylene)-
—O-aryl-
—(C$_1$-C$_{12}$ alkylene)-C(=O)—NR$^1$—C(=O)—(C$_1$-C$_{12}$ alkylene)-.

In all of the above, the —(C$_1$-C$_{12}$ alkylene)-, —(C$_2$-C$_{12}$ alkenylene)-, -cycloalkyl-, -heterocyclyl-, and -aryl- groups may be optionally substituted. Other chemically feasible combinations of moieties for Z can be determined by the person skilled in the art.

The structure of Formula (I) is particularly useful, as the W$_1$ and W$_2$ groups can readily be incorporated into a variety of polymers, especially polyurethanes. Suitably, W$_1$ and W$_2$ are independently selected from alcohol; primary amine; secondary amine; or thiol groups.

In addition, N represents a tertiary amine (i.e. a nitrogen atom bound directly to three carbon atoms, in which the carbon atoms are saturated alkyl or aryl carbon atoms), which can act as a catalyst for polyurethane formation, removing or reducing the need for a separate catalyst (e.g. 1,4-diazabicyclo[2.2.2]octane (DABCO), dimethylcyclohexylamine (DMCHA) and dimethylethanolamine (DMEA)) in the polymerization reaction.

When moieties of Formula (I) are described as being optionally substituted they may be substituted by one or more substitutents specified herein under the definition of "optionally substituted". In a preferred embodiment of the invention, the optional substituents on linker Z is selected from the groups consisting of —F, —Cl, —Br, —I, —CN, —NO$_2$, —C$_1$-C$_6$ alkyl, aryl, —O—(C$_1$-C$_6$ alkyl), —S—(C$_1$-C$_6$ alkyl), —S(O)—(C$_1$-C$_6$ alkyl), —SO$_2$—(C$_1$-C$_6$ alkyl), —NH—C(O)—(C$_1$-C$_6$ alkyl), —C(O)—NH—(C$_1$-C$_6$ alkyl), and —C(O)—NH$_2$.

Moieties X$_1$ and X$_2$

The groups X$_1$ and X$_2$ serve to connect the N-atom of Formula (I) with the end groups W$_1$ and W$_2$. The size and form of these groups can be varied to adjust the properties of the photoinitiator polymer such as e.g. a polyurethane photoinitiator polymer.

X$_1$ and X$_2$ may be the same or different, and are preferably the same, for ease of chemical synthesis. In one embodiment of the invention, X$_1$ and X$_2$ is each independently selected from optionally substituted C$_1$-C$_{12}$ alkylene, optionally substituted C$_2$-C$_{12}$ alkenylene, —O—, —S—, —NR$^4$—, —C(=O)—, —C(=NR$^3$)—, —Si(R$^3$)$_2$—O—, optionally substituted C$_3$-C$_8$ cycloalkyl, optionally substituted heterocyclyl, optionally substituted aryl, and combinations thereof, wherein R$^3$ is H or optionally substituted C$_1$-C$_{12}$ alkyl, and R$^4$ is optionally substituted C$_1$-C$_{12}$ alkyl. In that X$_1$ and X$_2$ may comprise combinations of the above-mentioned groups, the invention encompasses monomers in which X$_1$ and X$_2$ are made up of two or more of the above-mentioned groups in series.

Suitably, X$_1$ and X$_2$ are independently selected from optionally substituted C$_1$-C$_{12}$ alkylene, optionally substituted C$_2$-C$_{12}$ alkenylene, —O—, —S—, —NR$^4$—, —C(=O)—, —C(=NR$^3$)—, optionally substituted C$_3$-C$_8$ cycloalkyl, optionally substituted heterocyclyl, optionally substituted aryl, wherein R$^3$ is H or optionally substituted C$_1$-C$_{12}$ alkyl, preferably C$_1$-C$_6$ alkyl, more preferably C$_2$-C$_6$ alkyl, and R$^3$ is optionally substituted C$_1$-C$_{12}$ alkyl, preferably C$_1$-C$_6$ alkyl, more preferably C$_2$-C$_6$ alkyl.

Preferably, the X$_1$ and/or X$_2$ may be attached to the N atom of Formula (I) through a —CH$_2$— group. For example, when X$_1$ and X$_2$ are one of the above described groups, such as for example, but not limited to, the combination of —C(=O)—and optionally substituted C$_1$-C$_{12}$ alkylene it is preferred that X$_1$ and X$_2$ is attached via —CH$_2$—in the C$_1$-C$_{12}$ alkylene-C(=O)—.

R$^3$ may be H. R$^3$ may alternatively be optionally substituted C$_1$-C$_6$ alkyl, such as e.g. methyl, ethyl, propyl, butyl, pentyl or hexyl. R$^4$ may be optionally substituted C$_1$-C$_6$ alkyl, such as e.g. methyl, ethyl, propyl, isopropyl, butyl, isobutyl, pentyl, or isopentyl. In preferred embodiments R$^3$ or R$^4$ are each independently C$_2$-C$_6$ alkyl.

X$_1$ and X$_2$, or parts thereof, may be linked to one another or to linker Z to form one or more ring structures. X$_1$ and X$_2$ may be linked to one another to form one or more ring structures. In one embodiment of the invention X$_1$ and X$_2$ are not linked to one another or to the linker.

X$_1$ and X$_2$ may independently be selected from optionally substituted C$_1$-C$_{12}$ alkylene, —O—, —S—, —NR$^4$—, wherein R$^4$ is optionally substituted C$_1$-C$_{12}$ alkyl, and combinations thereof. Additionally, X$_1$ and X$_2$ may independently be optionally substituted C$_1$-C$_{12}$ alkylene, preferably optionally substituted C$_2$-C$_6$ alkylene.

In a specific embodiment of the invention, X$_1$ and X$_2$ are independently optionally substituted C$_1$-C$_{12}$ alkylene, and W$_1$ and W$_2$ are —CH$_2$OH.

End Groups, W$_1$, W$_2$

The end groups W$_1$ and W$_2$ in Formula (I) allow the photoinitiator to be incorporated into a growing polymer chain, such as e.g. a polyurethane chain. W$_1$ and W$_2$ are therefore selected from those functional groups which are reactive in polymerization reactions and which then are able to bond to other monomers. When the intended polymer is a polyurethane, the monomers may therefore have reactive W$_1$ and W$_2$ groups in the form of —OH or —NCO, as these are able to bond to other polyurethane monomers to thus form polyurethane.

In one embodiment of the invention, W$_1$ and W$_2$ are each independently selected from —OH, —CH$_2$OH, —NH$_2$, —NHR$^6$, —SH, —Si(OR$^6$)$_2$—H, —SiH(R$^6$)$_2$, —C(=O)—OSi(R$^6$)$_3$, —NCO, —NCS, —COOH, —COOR$^6$, —COO-aryl, —C(=O)—Cl, —O—C(=O)—Cl, —C(O)—NH$_2$, —C(O)—NHR$^5$, —NH—C(O)—OR$^5$, and —OC(O)—NHR$^5$, wherein R$^5$ is H or C$_1$-C$_6$ alkyl, and wherein R$^6$ is C$_1$-C$_6$ alkyl.

Preferably, W$_1$ and W$_2$ may independently be selected from the group consisting of —OH, —CH$_2$OH, —NH$_2$, —NHR$^5$, —SH, —NCO, —NCS, and —COOH. More preferably, selected from the group consisting of —CH$_2$OH, —NH$_2$, —NHR$^5$, and —SH.

Care should be taken when selecting suitable X$_1$ and X$_2$ groups, such that W$_1$ and W$_2$ fulfil these criteria. For example, X$_1$ and X$_2$ may independently be selected from optionally substituted C$_1$-C$_{12}$ alkylene, when W$_1$ and W$_2$ are —OH.

In the definitions of W$_1$ and W$_2$, —CH$_2$OH denotes primary alcohol attached onto X$_1$ or X$_2$. In the same manner in the definitions of W$_1$ and W$_2$, —OH is to be understood as a forming a secondary alcohol with X$_1$ or X$_2$.

Secondary amines may have the formula —NHR$^5$, where R$^5$ is C$_1$-C$_6$ alkyl.

R$^5$ and R$^6$ may independently be C$_1$-C$_6$ alkyl, such as e.g. methyl, ethyl, propyl, butyl, pentyl or hexyl. R$^5$ may additionally be H.

W$_1$ and W$_2$ are selected according to the design of the polymer. If desired, W$_1$ and W$_2$ may be different end groups. It is preferably for ease of synthesis of the photoinitiator, however, that W$_1$ and W$_2$ are the same.

When W$_1$ and W$_2$ are a two alcohol groups, it is preferred that these are attached at X$_1$ and X$_2$ so as both form a primary alcohol (i.e. —CH$_2$OH), or both form a secondary alcohol (i.e. —OH in the definition of W$_1$ and W$_2$). Hereby allowing for symmetric growth of the polymer chain. In the same manner, it is preferred that when W$_1$ and W$_2$ are two amine groups, i.e. —NH$_2$ or —NHR$^6$, they are either two primary amine groups or two secondary amine groups.

Accordingly, in one embodiment of the present invention W$_1$ and W$_2$ is selected from the group consisting of —OH, —CH$_2$OH, —NH$_2$, —NHR$^6$, —SH, —Si(OR$^6$)$_2$—H, —SiH(R$^5$)$_2$, —C(=O)—OSi$^6$)$_3$, —NCO, —NCS, —COOH, —COOR$^6$, —COO-aryl, —C(=O)—Cl, —O—C(=O)—Cl, —C(O)—NH$_2$, —C(O)—NHR$^6$, —NH—C(O)—OR$^5$, and —OC(O)—NHR$^5$, wherein R$^5$ is H or C$_1$-C$_6$ alkyl, R$^6$ is C$_1$-C$_6$ alkyl, and wherein W$_1$ and W$_2$ are the same.

In a preferred embodiment of the invention, W$_1$ and W$_2$ are selected from the group consisting of —OH, —CH$_2$OH, —NH$_2$, —NHR$^6$, —SH, —NCO, —NCS, and —COOH; and more preferably from the group consisting of —OH, —CH$_2$OH, —NH$_2$, —NHR$^6$, and —SH; wherein W$_1$ and W$_2$ are the same.

A preferred embodiment of the invention relates to polymer (P) prepared from monomers (A) of general formula (I), or subformulas thereof, where W$_1$ and W$_2$ are the same and either —OH or —CH$_2$OH.

In that only two end groups W$_1$ and W$_2$ are present, the photoinitiator does not promote branching of for example a polyurethane. Instead, the photoinitiator moieties of Formula (I) are incorporated partly into the polymer chain, while the photoinitiator moieties are pendant from the chain via the linker Z.

Tertiary Amine, N

In the photoinitiator monomer (A) described by Formula (I), N represents a tertiary amine (i.e. a nitrogen atom bound directly to three carbon atoms, in which the carbon atoms are saturated alkyl or aryl carbon atoms).

The N atom in the photoinitiators in Formula (I) has a number of functions. Firstly, and most importantly the N atom in the photoinitiators of Formula (I)—being a tertiary amine—is basic. Suitably, the N atom has a $pK_b$ of less than 13, preferably a $pK_b$ less than 6. The amine N atom is therefore able to partially or completely replace the amine catalysts which are typically used in polyurethane polymerization reactions (e.g. 1,4-diazabicyclo[2.2.2]octane (DABCO), dimethylcyclohexylamine (DMCHA) and dimethylethanolamine (DMEA)). In this way, the use of such low molecular weight tertiary amine catalysts can be reduced or completely avoided. The fewer additives added during polymerization, the fewer compounds or reaction byproducts may migrate from the final polymer.

When the N atom is crowded due to large or bulky $X_1$ and/or $X_2$ groups attached thereto, the effectivity of the N atom as a catalyst decreases. Therefore, in one embodiment of Formula (I), $X_1$ and/or $X_2$ are each independently selected to provide less crowded N atoms, hence $X_1$ and $X_2$ may preferably each independently be selected from groups that are attached to the N-atom via carbon atom which carries no more than one substituent other than hydrogen such as e.g. —$CH_2$— group.

The tertiary amine in the structure, when irradiated with UV, can have a proton abstracted by the photoinitiator moiety (either intramolecularly or intermolecularly) from the carbon atoms adjacent to the amino nitrogen. This will give rise to an active radical capable of initiating polymerization or cross-linking.

Quaternary Ammonium, $N^+$ and $R^7$

As mentioned herein previously, it may be advantageous to increase the solubility of the polymer (P), one way of doing this is by introducing a cation. In one embodiment of the invention the first monomer (A) comprises a photoinitiator moiety together with a quaternary ammonium group. In a preferred embodiment of the invention, such a first monomer (A) is of Formula (II):

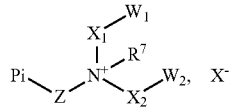

(II)

Wherein Pi, Z, $X_1$, $X_2$, $W_1$ and $W_2$ is as defined herein in relation to Formula (I); and $R^7$ is selected from optionally substituted $C_1$-$C_{12}$ alkyl, optionally substituted $C_3$-$C_{12}$ alkenyl, optionally substituted $C_3$-$C_{12}$ alkynyl, optionally substituted $C_3$-$C_{12}$ cycloalkyl, optionally substituted —[($C_1$-$C_6$ alkylene)-O—($C_1$-$C_6$ alkylene)]$_p$-H moiety, optionally substituted heterocyclyl, and optionally substituted aryl;

p is an integer from 1-6, preferably from 1-2;

$X^-$ is a counterion, or a negatively charged moiety that is covalently bound to any carbon atom of Pi, Z, $R^7$, $X_1$, $X_2$ or their optional substituents, to form a betaine-type structure;

$X_1$ and $X_2$ or a part thereof may be linked to one another or to linker Z or $R^7$, to form one or more ring structures; and Z, $R^7$, $X_1$ and $X_2$ are selected such that N is a quaternary amine.

In the photoinitiator monomer (A) described by Formula (II), $N^+$ represents a quaternary ammonium (i.e. a nitrogen atom bound directly to four carbon atoms, in which the carbon atoms are saturated alkyl or aryl carbon atoms).

The N atom in Formula (II) has a number of functions. Firstly, it provides the appropriate branching of the molecule, so that the photoinitiator moieties in the polymer (P) becomes pendant from the polymer (P) backbone. Secondly, it provides the desired water solubility of both the photoinitiator monomers (A) and the final polymer (P). Thirdly, the ammonium cation acts to stabilise an intermediate benzophenone radical anion by preventing back electron transfer during radical processes.

In addition, monomers having formula (II) allows formulating highly concentrated aqueous solutions due to the introduced quaternary amine. Furthermore, when an alkoxy, amine or thioalkoxy link are used as Z it confers good hydrolytic stability at the same time as providing an improved UV absorption profile due to positive mesomeric effect (M+) of the heteroatoms (N, O or S) in the linker.

In a preferred embodiment of formula (II),

Pi is a photoinitiator moiety; Z is a linker moiety;

$R^7$ is selected from optionally substituted $C_1$-$C_{30}$ alkyl, optionally substituted $C_3$-$C_{30}$ alkenyl, optionally substituted $C_3$-$C_{30}$ alkynyl, optionally substituted $C_3$-$C_{12}$ cycloalkyl, optionally substituted —[($C_1$-$C_6$ alkylene)-O—($C_1$-$C_6$ alkylene)]$_p$-H moiety, optionally substituted heterocyclyl, and optionally substituted aryl; p is an integer from 1-6;

$X_1$ and $X_2$ are each independently selected from optionally substituted $C_1$-$C_{12}$ alkylene, optionally substituted $C_2$-$C_{12}$ alkenylene, —O—, —S—, —$NR^4$—, —C(=O)—, —C(=$NR^3$)—, —Si($R^3$)$_2$—O—, optionally substituted $C_3$-$C_8$ cycloalkyl, optionally substituted heterocyclyl, optionally substituted aryl, and combinations thereof;

$X_1$ and $X_2$ or a part thereof may be linked to one another or to linker Z or $R^7$, to form one or more ring structures; Z, $R^7$, $X_1$ and $X_2$ are selected such that N is a quaternary amine;

$R^3$ is H or optionally substituted $C_1$-$C_{12}$ alkyl;

$R^4$ is optionally substituted $C_1$-$C_{12}$ alkyl;

$X^-$ is a counterion, or a negatively charged moiety that is covalently bound to any carbon atom of Pi, Z, $R^7$, $X_1$, $X_2$ or their optional substituents, to form a betaine-type structure;

$W_1$ and $W_2$ are each independently selected from —OH, —$CH_2OH$, —$NH_2$, —$NHR^6$, —SH, —Si($OR^6$)$_2$—H, —SiH($R^6$)$_2$, —C(=O)—OSi($R^6$)$_3$, —NCO, —NCS, —COOH, —$COOR^6$, —COO-aryl, —C(=O)—Cl, —O—C(=O)—Cl, —C(O)—$NH_2$, —C(O)—$NHR^5$, —NH—C(O)—$OR^5$, and —OC(O)—$NHR^5$;

$R^5$ is H or $C_1$-$C_6$ alkyl; and $R^6$ is $C_1$-$C_6$ alkyl.

In one preferred embodiment $R^7$ is selected from optionally substituted $C_1$-$C_{12}$ alkyl, optionally substituted $C_3$-$C_{12}$ alkenyl, optionally substituted $C_3$-$C_{12}$ alkynyl, and optionally substituted —[($C_1$-$C_6$ alkylene)-O—($C_1$-$C_6$ alkylene)]$_p$-H moiety; wherein p is an integer from 1-2.

In a specifically preferred embodiment of the invention $R^7$ is selected from optionally substituted $C_6$-$C_{12}$ alkyl, optionally substituted $C_6$-$C_{12}$ alkenyl, optionally substituted $C_6$-$C_{12}$ alkynyl, and optionally substituted —[($C_3$-$C_6$ alkylene)-O—($C_3$-$C_6$ alkylene)]$_p$-H moiety; wherein p is an integer from 1-2, and alkyl, alkylene, alkenyl or alkynyl are linear. More preferably the alkyl, alkylene, alkenyl or alkynyl are unsubstituted.

The linker Z, $R^7$, $X_1$, and $X_2$ are selected such that N is a quaternary ammonium (i.e. so that the atom adjacent N is a saturated carbon atom, or an aryl carbon atom). Preferably, at least two of the groups Z, $R^7$, $X_1$ and $X_2$ attached to the ammonium group are alkyl.

In Formula (II) Pi, Z, $X_1$, $X_2$, $W_1$, $W_2$, $R^1$, $R^2$, $R^3$, $R^4$, $R^5$, $R^6$, and n, may each independently be as described herein above and below for general Formula (I), mutatis mutandis.

It will be apparent to one skilled in the art that the monomers (A) of Formula (II) and polymers (P) of the invention, containing a quaternary ammonium moiety, will be present in their ammonium salt forms. When the photoinitiators of formula (II) are mentioned herein it is implied that they are present in their ammonium salt form. Such salt forms are included within the scope of the invention.

$X^-$, as used herein, denotes the counterion of the ammonium salt, hence $X^-$ is a counterion, or a negatively charged moiety, such as e.g. $-SO_3^-$, $-COO^-$, $-OSO_3^-$ or $-O-P(=O)(O\text{-alkyl})O^-$, that is covalently bound to any carbon atom of Pi, Z, $R^7$, $X_1$, $X_2$ or their optionally substituents to form a betaine-type structure. Non-limiting examples of such anionic counterions include fluoride, chloride, bromide, iodide, sulfate, carbonate, phosphate, tetrafluoroborate, tetraarylborate (e.g. tetraphenylborate), hexafluorophosphate, alkyl carboxylate (e.g. acetate), aryl carboxylate (e.g. benzoate), alkyl sulfonate (e.g. mesylate) and aryl sulfonate (e.g. tosylate). Preferably $X^-$ may be selected from chloride, bromide, iodide, sulfate, tetrafluoroborate, hexafluorophosphate, acetate, benzoate, mesylate, triflate and tosylate, and more preferably $X^-$ may be selected from chloride, bromide and iodide.

The term "form a betaine-type structure", as used herein, denotes that the monomers of Formula (II) may themselves form a structure where a negatively charged counterion $X^-$ is covalently bound to any carbon atom of Pi, Z, $R^7$, $X_1$, $X_2$ or their optionally substituents, and balances the positive charge of the quaternary ammonium moiety. Non-limiting examples of such negatively charged moieties include $-SO_3^-$, $-COO^-$, $-OSO_3^-$ and $-O-P(=O)(O\text{-alkyl})O^-$.

Substructures of Formula (I)

As a substructure to the structure of Formula (I), the first monomer (A) may have the general formula (Ia):

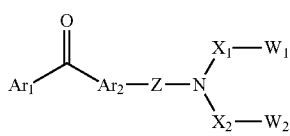

(Ia)

wherein $Ar_1$ and $Ar_2$ each independently are selected from the same or different optionally substituted aryl; and Z, N, $X_1$, $X_2$, $W_1$ and $W_2$ are as defined above, and where Z may be present at any position on $Ar_2$. Suitably, in Formula (Ia), $Ar_1$ and $Ar_2$ are both optionally substituted phenyl, preferably both phenyl. Additionally, in Formula (Ia), Z may be present at the para-position of $Ar_2$.

A further sub-structure to that of Formula (I) for the photoinitiator monomer (A) has the general formula (Ib):

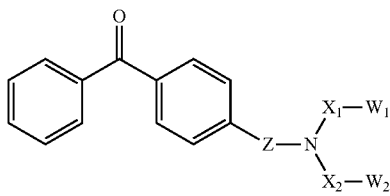

(Ib)

wherein Z, N, $X_1$, $X_2$, $W_1$ and $W_2$ are as defined above.

A further sub-structure to that of Formula (I) for the photoinitiator monomer (A) has the general formula (Ic):

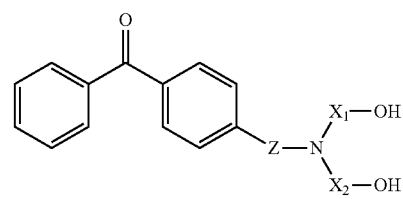

(Ic)

wherein Z, N, $X_1$, and $X_2$ are as defined above.

Specific Monomers (A):

Suitable first monomers (A) which fall within the scope of Formula (I) include:
{4-[bis(2-hydroxyethyl)amino]phenyl}(phenyl)methanone;
(4-{[bis(2-hydroxyethyl)amino]methyl}phenyl)(phenyl) methanone;
[4-({2-[bis(2-hydroxyethyl)amino]ethyl}sulfanyl)phenyl] (phenyl)methanone;
(4-{3-[bis(2-hydroxyethyl)amino]propoxy}phenyl)(phenyl) methanone;
{4-[bis(2-hydroxypropyl)amino]phenyl}(phenyl)methanone;
N,N-bis(2-hydroxyethyl)-2-(phenylcarbonyl)benzamide;
N,N-bis(2-hydroxypropyl)-2-(phenylcarbonyl)benzamide;
3,4-dihydroxy-1-[4-(phenylcarbonyl)phenyl]pyrrolidine-2,5-dione;
N,N-bis[2-(methylamino)ethyl]-4-(phenylcarbonyl)benzamide;
(4-{[bis(2-hydroxyethyl)amino]methyl}phenyl)[4-(phenylsulfanyl)phenyl]methanone;
4-{3-[bis(2-hydroxyethyl)amino]propoxy}-1-chloro-9H-thioxanthen-9-one;
4-[{2-[bis(2-hydroxyethyl)amino]ethyl}(methyl)amino]-1-chloro-9H-thioxanthen-9-one;
2-[bis(2-hydroxyethyl)amino]ethyl[(9-oxo-9H-thioxanthen-2-yl)oxy]acetate;
1-[bis(2-hydroxyethyl)amino]-4-propoxy-9H-thioxanthen-9-one;
2-[(1-chloro-9-oxo-9H-thioxanthen-4-yl)oxy]-N,N-bis(2-hydroxyethyl)acetamide;
1-{4-[bis(2-hydroxyethyl)amino]phenyl}-2-hydroxy-2-methylpropan-1-one;
1-(4-{2-[bis(2-hydroxyethyl)amino]ethoxy}phenyl)-2-hydroxy-2-methylpropan-1-one;
2-methyl-2-(morpholin-4-yl)-1-(4-{[bis(2-hydroxyethyl) amino]methyl}phenyl)propan-1-one; and
(3',5'-diisocyanatobiphenyl-4-yl)(phenyl)methanone.

Photoinitiator monomers (A) of Formula (I) of particular interest are:
{4-[bis(2-hydroxyethyl)amino]phenyl}(phenyl)methanone;
(4-{[bis(2-hydroxyethyl)amino]methyl}phenyl)(phenyl) methanone;
(4-{3-[bis(2-hydroxyethyl)amino]propoxy}phenyl)(phenyl) methanone;
{4-[bis(2-hydroxypropyl)amino]phenyl}(phenyl)methanone;
N,N-bis(2-hydroxyethyl)-2-(phenylcarbonyl)benzamide;
4-{3-[bis(2-hydroxyethyl)amino]propoxy}-1-chloro-9H-thioxanthen-9-one;
2-[bis(2-hydroxyethyl)amino]ethyl[(9-oxo-9H-thioxanthen-2-yl)oxy]acetate;

2-[(1-chloro-9-oxo-9H-thioxanthen-4-yl)oxy]-N,N-bis(2-hydroxyethyl)acetamide; or
1-{4-[bis(2-hydroxyethyl)amino]phenyl}-2-hydroxy-2-methylpropan-1-one.

Suitable photoinitiator monomers (A) of Formula (II) according to the invention include:
4-({[(4-benzoylphenyl)methyl]bis(2-hydroxyethyl)ammoniumyl}methyl)benzoate;
[(4-benzoylphenyl)methyl]bis[2-(2-hydroxyethoxy)ethyl]methylammonium bromide;
[2-(4-benzoylphenyl)-2-oxoethyl]bis(2-hydroxyethyl)methylammonium bromide;
[2-(2-benzoylbenzoyloxy)ethyl]bis(2-hydroxyethyl)methylammonium bromide;
[3-(4-benzoylphenoxy)propyl]bis(2-hydroxyethyl)methylammonium bromide;
[3-(4-benzoylphenoxy)propyl](benzyl)bis(2-hydroxyethyl)ammonium bromide;
3-{[3-(4-benzoylphenoxy)propyl]bis(2-hydroxyethyl)ammonium}propane-1-sulfonate;
{2-[(4-benzoylphenyl)sulfanyl]ethyl}(ethyl)bis(2-hydroxyethyl)ammonium iodide;
[2-(4-benzoylphenoxy)ethyl]bis(2-hydroxypropyl)methylammonium 4-methylbenzene-1-sulfonate;
2-{[2-(4-benzoylphenoxy)ethyl]bis(2-hydroxyethyl)ammoniumyl}ethane-1-sulfonate;
2-[bis(2-aminoethyl)[3-(4-benzoylphenoxy)propyl]ammoniumyl]acetate;
{3-[(1-chloro-9-oxo-9H-thioxanthen-4-yl)oxy]propyl}bis(2-hydroxyethyl)methylammonium bromide;
{3-[(1-chloro-9-oxo-9H-thioxanthen-4-yl)oxy]propyl}bis(2-hydroxyethyl)ethylammonium iodide;
2-({3-[(1-chloro-9-oxo-9H-thioxanthen-4-yl)oxy]propyl}bis(2-hydroxyethyl)ammoniumyl)ethane-1-sulfonate;
bis(2-hydroxyethyl)methyl[2-({2-[(9-oxo-9H-thioxanthen-2-yl)oxy]acetyl}oxy)ethyl]ammonium chloride;
(cyanomethyl)({2-[4-(2-hydroxy-2-methylpropanoyl)phenoxy]ethyl})bis(2-hydroxyethyl)ammonium 4-bromobenzene-1-sulfonate; or
benzyl({3-[(1-chloro-9-oxo-9H-thioxanthen-4-yl)oxy]propyl})bis(2-hydroxyethyl)ammonium bromide.

Preferred photoinitiator monomers (A) of Formula (II) include:
[3-(4-benzoylphenoxy)propyl]bis(2-hydroxyethyl)methylammonium bromide;
[3-(4-benzoylphenoxy)propyl](benzyl)bis(2-hydroxyethyl)ammonium bromide;
3-{[3-(4-benzoylphenoxy)propyl]bis(2-hydroxyethyl)ammonium}propane-1-sulfonate;
4-({[(4-benzoylphenyl)methyl]bis(2-hydroxyethyl)ammoniumyl}methyl)benzoate;
{3-[(1-chloro-9-oxo-9H-thioxanthen-4-yl)oxy]propyl}bis(2-hydroxyethyl)methylammonium bromide; or
benzyl({3-[(1-chloro-9-oxo-9H-thioxanthen-4-yl)oxy]propyl})bis(2-hydroxyethyl)ammonium bromide.

Dye Moiety (DYE)

Dye moieties (DYE) are moieties which absorb radiation in the visible or the infrared portion of the spectrum.

The colour of a specific dye moiety is determined by its absorption spectrum and the transition probabilities for specific electronic excitations are of importance. These probabilities can be controlled by choosing electron-rich and electron-poor substituents in order to achieve high transition moments for the excitation. In addition, the effective conjugation length of organic dyes is also a factor. Some preferred molecular motifs in dye moieties are azo-compounds and phthalocyanines with various substitution patterns and metal ions.

Photochemically, the dyes should preferably be inert. Ideally, the dyes should also have a low singlet oxygen quantum yield to prevent photodegradation.

If absorbing in the visible region, the dye moiety (DYE) has a visible light absorption between 300-900 nanometers, suitably between 350 and 850 nm, most preferably between 400 and 800 nm. If absorbing in the infrared region, the dye moiety (DYE) has a light absorption between 700-1500 nanometers, preferably between 730 and 1200 nm, more preferably between 750 and 1000 nm. Dye moieties which absorb in the visible region are preferred, as these are visible to the human eye without specific IR equipment.

The dye moieties may typically constitute 0.01-80% by weight, such as e.g. 0.01-50% by weight, preferably 0.5-80% by weight, such as e.g. 1-50% by weight, more preferably 1-30% by weight of the polymer (P).

The dye moieties suitably constitute 0.01-50% by weight, such as 0.05-30% by weight, of a thermoplastic polymer.

As previously stated, the polymer (P) may preferably be a co-polymer of at least one monomer (A) with at least one second monomer (B), wherein said second monomer (B) comprises a dye moiety (DYE). The second monomer (B) may comprise a dye moiety (DYE) having at least two functional groups $W_3$ and $W_4$ covalently bonded thereto, said $W_3$ and $W_4$ being independently selected from alcohol; primary amine; secondary amine; thiol; alkoxy silane; silane esters of carboxylic acids; isocyanate; isothiocyanate; carboxylic acid; chloroformate; primary amide; secondary amide; urethane or urea groups. In a specific embodiment monomer (B) comprises at least two functional groups $W_3$ and $W_4$, said $W_3$ and $W_4$ being independently selected from halogen, —OH, —CH$_2$OH, —NH$_2$, —NHR$^9$, —SH, —Si(OR$^9$)$_2$—H, —SiH(R$^9$)$_2$, —C(=O)—OSi(R$^9$)$_3$, —NCO, —NCS, —COOH, —COOR$^9$, —COO-aryl, —C(=O)—Cl, —O—C(=O)—Cl, —C(O)—NH$_2$, —C(O)—NHR$^8$, —NH—C(O)—OR$^8$, and —OC(O)—NHR$^8$, wherein R$^8$ is H or C$_1$-C$_6$ alkyl, and wherein R$^9$ is C$_1$-C$_6$ alkyl.

In a preferred embodiment of the invention, $W_3$ and $W_4$ are each independently selected from —OH, —CH$_2$OH, —NH$_2$, —NHR$^9$, and —NCO. In a more preferred embodiment of the invention, $W_3$ and $W_4$ are each independently selected from —CH$_2$OH, —NH$_2$, and —NCO. In an even more preferred embodiment of the invention, $W_3$ and $W_4$ are each independently selected from —CH$_2$OH and —NH$_2$.

In a more preferred embodiment of the invention $W_3$ and $W_4$ are each independently selected from —OH, and —CH$_2$OH.

Preferred options of R$^8$ and R$^9$ are as described herein for R$^5$ and R$^6$, mutatis mutandis.

$W_1$, $W_2$ (as set out above) and $W_3$ and $W_4$ may be selected such that—in the co-polymerization of first (A) and second (B) monomers—$W_1$ reacts with $W_3$ to form a urethane, thiourethane, urea, thiourea, ester, ether, amide, carbonate, allophanate or biuret moiety, and $W_2$ reacts with $W_4$ to form a urethane, thiourethane, urea, thiourea, ester, ether, amide, carbonate, allophanate or biuret moiety. Polymerization of the polymers (P) is then achieved by step-growth co-polymerization of monomers (A) and (B).

Alternatively, $W_3$ and $W_4$ may be selected such that—in the co-polymerization of monomers (A), (B), (C) and (D)—these react with functional groups on monomer (C) and/or (D). For instance if monomer (B) has two primary alcohols as the $W_3$ and $W_4$ groups, then these may react with two isocyanate groups on monomers (C) and/or (D), in order to form a polyurethane.

In particular, the second monomer (B) may have the structure of formula VII:

$$W_3\text{-}Q\text{-}W_4 \quad (VII)$$

wherein $W_3$ and $W_4$ are defined above and wherein Q is selected from the group consisting of optionally substituted $C_1$-$C_{12}$ alkylene, optionally substituted $C_2$-$C_{12}$ alkenylene, optionally substituted $C_3$-$C_8$ cycloalkyl, optionally substituted $C_3$-$C_{12}$ heterocyclyl, optionally substituted aryl, optionally substituted biaryl, —[O—($C_1$-$C_{12}$ alkylene)]$_{mm}$-, —[S—($C_1$-$C_{12}$ alkylene)]$_{mm}$-, where mm is an integer from 1-1000, and combinations thereof, wherein Q is substituted with a dye moiety (DYE).

In an alternative embodiment $W_3$ and $W_4$ are as defined above, and Q is selected from the group consisting of optionally substituted $C_1$-$C_{12}$ alkylene, optionally substituted $C_1$-$C_{12}$ alkenylene; optionally substituted $C_3$-$C_{12}$ heterocyclyl; optionally substituted aryl; optionally substituted biaryl; —[O—($C_1$-$C_{12}$ alkylene)]$_{mm}$-; —[S—($C_1$-$C_{12}$ alkylene)]$_{mm}$-; where mm is an integer from 1-1000; and combinations thereof, wherein Q is substituted with a dye moiety (DYE).

In a further embodiment, Q is selected from the group consisting of optionally substituted $C_1$-$C_{12}$ alkylene, optionally substituted $C_2$-$C_{12}$ alkenylene, optionally substituted $C_3$-$C_8$ cycloalkyl, optionally substituted $C_3$-$C_{12}$ heterocyclyl, optionally substituted aryl, and optionally substituted biaryl, wherein Q is substituted with a dye moiety (DYE). Q may be selected from the group consisting of optionally substituted aryl and optionally substituted biaryl, wherein Q is substituted with a dye moiety (DYE). Suitably, the dye moiety (DYE) is selected from the group consisting of azo-dyes, preferably azo-dyes substituted with one or more hydroxyl groups; anthraquinone dyes; di- and tricyanovinyl dyes; methine dyes; phthalocyanine dyes and aniline dyes, including indoaniline dyes.

Suitable azo-dyes may be Milliken's Reactint® colorants REACTINT YELLOW X15, REACTINT ORANGE X96, REACTINT RED X64, REACTINT BLUE X17AB, REACTINT BLUE X3LV, REACTINT VIOLET X8OLT and REACTINT BLACK X41LV.

Suitable dyes are also disclosed e.g. in U.S. Pat. No. 4,284,729, U.S. Pat. No. 4,507,407, U.S. Pat. No. 4,751,254, U.S. Pat. No. 4,761,502, U.S. Pat. No. 4,775,748, U.S. Pat. No. 4,846,846, U.S. Pat. No. 4,912,203, U.S. Pat. No. 4,113,721 and U.S. Pat. No. 5,864,002.

Suitably, numerous anthraquinone derivatives, such as the polyhydroxy- and polycarboxy-anthraquinones disclosed in U.S. Pat. No. 4,267,306, U.S. Pat. No. 4,359,570, U.S. Pat. No. 4,403,092, U.S. Pat. No. 4,804,719, U.S. Pat. No. 4,999,418, U.S. Pat. No. 5,032,670, U.S. Pat. No. 5,194,463, U.S. Pat. No. 5,372,864, U.S. Pat. No. 5,955,560, U.S. Pat. No. 5,962,557 and WO 98/236090 may be used.

Suitably, anthraquinone derivatives carrying two reactive terminal amino groups, such as those disclosed in U.S. Pat. No. 4,137,243, may be used.

Suitably, copolymerizable vinyl-anthraquinones disclosed in WO 02/12400 and WO 02/12401, may also be used.

Suitably, azo, tricyanovinyl, anthraquinone, methine and indoaniline dyes carrying reactive groups capable of copolymerization, such as those disclosed in U.S. Pat. No. 4,619,990, may also be used.

The exposure of organic dyes to UV light during UV irradiation may lead to both irreversible (bleaching) and reversible (photochromic) changes in the colour composition. In the case of dyes containing azo moieties (—N═N—), cis-trans photoisomerisation around the N═N bond may in some cases lead to reversible changes of intensity and wavelength of the visible absorption bands leading to undesirable discoloration (S. A. Ahmed, A. A. Abdel-Wahab, and H. Dürr, CRC Handbook of Organic Photochemistry and Photobiology, CRC Press, 2004).

Therefore, in one embodiment of the invention the dye moiety is without an azo moiety. In a preferred embodiment of the invention, the dye is selected from anthraquinone dyes, aminoanthraquinone dyes, acridine dyes, triphenylmethane dyes, phthalocyanine dyes, quinone-imine dyes, tetrazolium salt dyes, thiazolium salt dyes and xanthene dyes.

In a preferred embodiment of the invention, the herein above described dyes are functionalized with two primary hydroxyl groups. By having such groups the dye moieties are suitable as co-monomers for incorporation directly into polyurethane polymers. Examples of such difunctionalized dies are disclosed, for example, in US patent application No. US20080295261. Functional groups for incorporation of the dye moiety into the polymer (P) may be added to the desired dye moieties by general chemical reactions known to the organic chemist. For example, many dye molecules contain a primary aromatic amino group $NH_2$. Such dyes may be reacted with (m+n) moles of ethylene oxide leading to double ethoxylation of the amino group to provide a H—{(OCH$_2$CH$_2$)$_m$}—N—{(CH$_2$CH$_2$O)$_n$}—H moiety, which is terminated by two reactive primary hydroxyl groups. Similarly, many dye molecules contain two primary aromatic amino groups $NH_2$. These can be directly converted into isocyanate moieties —N═C═O by reaction with phosgene (COCl$_2$) or diphosgene (Cl—CO—OCCl$_3$). This provides a DYE molecule with two isocyanate moieties that can be incorporated into a polyurethane or polyurea polymer.

The dye moiety (DYE) can also be covalently linked to the polymer via cationic moieties, this may be performed in an analogous manner to the methods set out above for the photoinitiator moiety (PI). Preferably, dye moieties are used which are sufficiently stable against UV-irradiation.

Substituents on the dye moieties may be chosen such that they promote not only water solubility but also such that the dye has a comparable higher oxidation potential. The higher oxidation potential prevents or diminishes the effect of photobleaching due to reactions with oxygen and ozone. The substitution pattern on the dye should ideally also consist of auxochromes with no α-hydrogens.

Additional Components

In addition to first (A) and second (B) monomers, the polymer may contain one or more additional monomers (C, D) or even further monomers. The additional monomers do not contain photoinitiator or dye moieties. The additional monomers may be added to change the physical or chemical properties of the polymer (e.g. glass transition temperature, viscosity, hydrophilicity/hydrophobicity or adherence to a given substance). Additional monomers (C, D) may also function as a chemical link between first (A) and second (B) monomers.

One class of additional monomer, (C), is selected from the group consisting of: polyethylene glycol (PEG), polypropylene glycol (PPG), random and block poly(ethylene glycol)-poly(propylene glycol) copolymers, poly(tetramethylene glycol) (PTMG), poly(1,4-butanediol adipate), poly (ethanediol 1,4-butanediol adipate), poly(caprolacton) diol, poly(1,6-hexanediol carbonate) and poly(ethylene terephthalate) diol.

In one embodiment of the invention, at least one of the one or more additional monomer (C) is selected from low molecular weight alkylene glycols, diols and combinations thereof. The one or more monomer (C) may be seen as a chain extender in the polymer (P).

The term "low molecular weight alkylene glycols" is intended to mean alkylene glycols where the alkylene part is of 2 to 6 carbon atoms, and the number of repeating units are in a range from 1 to 10. Non-limiting examples are ethylene glycol, diethylene glycol, tri ethylene glycol, propylene glycol, dipropylene glycol, tripropylene glycol, PEG200, PEG 300, PPG 200, PPG 300 or PPG 400.

The term "diols" is intended to mean alkyl, cycloalkyl, or aryl diols, non-limiting examples of these are 1,3-propanediol, 1,3-butanediol, 1,4-butanediol, 2,3-butanediol, 2-methyl-1,3-propanediol, 2,2-dimethylpentanediol, 1,6-hexanediol, 1,5-pentanediol, 2,4-pentanediol, 2-methyl-2-ethyl-1,3 propanediol, 2-ethyl-1,3-hexanediol, thiodiglycol, 2,2-dimethyl propane-1,3-diol, bis(2-hydroxyethyl) disulphide, 1,2-dimethyl-1,2-cyclopentanediol, 1,2-cyclohexanediol, cyclohexanedimethanol, 1,4-bis(hydroxymethyl)benzene, hydroquinone. In one embodiment of the invention, at least one of the one or more additional monomer (C) is a diol selected from the group consisting of the here specified diols. Preferably, such diols may be $C_2$-$C_{12}$ diols, i.e. diols having from 2 to 12 carbon atom in the alkyl, aryl or cycloalkyl moiety.

Preferably, additional monomers (C) may be chosen such that the resulting polymer is water-dispersible or water-soluble, most preferably water-soluble. In order to achieve this, monomer C suitably may contain a hydrophilic moiety or moieties that may be cationic, anionic or non-ionic. Most suitably cationic hydrophilic monomers C may contain quaternary ammonium moieties or protonatable tertiary amine moieties. Most suitably, an anionic hydrophilic monomers C may contain sulphonic or carboxylic acid moieties. A non-limiting example of a carboxylic acid containing diol monomer is dimethylolpropionic acid (DMPA). A non-limiting example of sulfonic acid containing monomer is sulfonated polyethylene terephthalate diol. Most suitably, non-ionic hydrophilic monomer C may be a low molecular weight polymer, such as e.g. PEG 2000; preferably monomer (C) may be one or more polyethylene glycols (PEG), such as e.g. PEG 200, PEG 400, PEG 600, PEG 1000, PEG 2000, PEG 4000, PEG 6000, PEG 8000, PEG 10000 or combinations thereof. Accordingly, in one embodiment of the invention, at least one of the one or more monomer (C) is selected from the group consisting of PE 600, PEG 1000, PEG 2000 and PEG 4000.

Typically, at least one of the one or more additional monomers (D), may be a polyisocyanate, preferably a diisocyanate; a carboxylic diester; or dicarboxylic acid. Polyisocyanates are typically used in polyurethane formation, whereas the latter two are typically used in polyester formation.

In one embodiment of the invention, the one or more additional monomers (D) is a polyisocyanate; preferably at least one of the one or more additional monomers (D) is a diisocyanate. Suitable polyisocyanates have an average of about two or more isocyanate groups, preferably an average of about two to about four isocyanate groups and include aliphatic, cycloaliphatic, aralkyl and aromatic polyisocyanates, used alone or in mixtures of two or more; diisocyanates of these are preferred; this is for example the case where the polymeric photoinitiator is a polyurethane.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate and 2,4,4-trimethyl-hexamethylene diisocyanate.

Specific examples of suitable cycloaliphatic polyisocyanates include dicyclohexylmethane diisocyanate, isophorone diisocyanate, 1,4-cyclohexane diisocyanate, 1,3-bis-(isocyanatomethyl) cyclohexane and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate and the like. A preferred aromatic polyisocyanate is toluene diisocyanate.

In one embodiment of the invention, the at least one of the one or more additional monomers (D) is selected from hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, dicyclohexylmethane diisocyanate, isophorone diisocyanate, 1,4-cyclohexane diisocyanate, 1,3-bis-(isocyanatomethyl) cyclohexane m-tetramethyl xylylene diisocyanate, p-tetramethyl xylylene diisocyanate, 1,4-xylylene diisocyanate, 1,3-xylylene diisocyanate, 4,4'-diphenylmethylene diisocyanate, toluene diisocyanate, their isomers, and naphthalene diisocyanate.

In another embodiment of the invention, the additional monomers (D), is selected from the group consisting of: 1,4-phenylene diisocyanate (PPDI), toluene diisocyanate (TDI) as both its 2,4 and 2,6 isomers, methylene diphenyl diisocyanate (MDI) as both its 4,4' and 2,4' isomers, 1,5-naphthalene diisocyanate (NDI), 3,3'-bitolylene-4,4'-diisocyanate (TODD, 1,3-xylylenediisocyanate (XDI), tetramethyl-m-xylidene diisocyanate (TMXDI), 1,6-hexamethylene diisocyanate (HDI), isophorone diisocyanate (IPDI), bis(4-isocyanatocyclohexyl)methane (HMDI), and 2,2,5-trimethylhexane diisocyanate (TMHDI), 1,4-cyclohexane diisocyanate (CHDI), and 1,3-bis(isocyanatomethyl)cyclohexane (HXDI).

In another preferred embodiment of the invention, monomer (D) is preferably an aliphatic diisocyanate selected from bis(isocyanatocyclohexyl)methane as its 4,4' and 2,4' isomers, hexamethylene diisocyanate (HDI) and isophorone diisocyanate (IPDI).

Synthesis

To manufacture the polymers (P) according to the invention, a number of methods may be used. Photoinitiator moieties (PI) and dye moieties (DYE) may be grafted onto a pre-formed polymer.

Alternatively, photoinitiator moieties (PI) and dye moieties (DYE) may be provided with polymerizable groups, which can then be polymerized together to form a polymer. The present invention further relates to a method of manufacturing polymer (P) as defined herein, comprising the steps of:

a. providing at least one first monomer (A) comprising a photoinitiator moiety (PI)
b. providing at least one second monomer (B) comprising a dye moiety (DYE),
c. optionally providing one or more additional monomers (C, D), d. polymerizing the first (A) and second (B) monomers, and optionally the additional monomers (C, D), together to form a polymer.

The first monomer comprising a photoinitiator moiety may for instance have a structure according to Formula (I), (II), (Ia) or (Ib), as described herein elsewhere in detail.

Alternatively, the first and second monomer together with any optional additional monomers may be polymerized via free radical polymerization. In this scenario, the first monomer (A) comprising a photoinitiator moiety and a second monomer (B) comprising a dye moiety each incorporate an acryloyl moiety ($CR_2$=CH—C(=O)—). The resultant polymer (P) is then a polyacrylate. Hence, the monomer (A) and (B), here exemplified with the DYE moiety, may then e.g. have the structure: $CR_2$=CH—C(=O)—O-Spacer-DYE or $CR_2$=CH—C(=O)—NR-Spacer-DYE.

By this method, a polymer (P) according to the present invention is obtained, it being a co-polymer of the at least one first monomer (A), the at least one second monomer (B), and optionally one or more additional monomers (C, D).

One embodiment of the invention relates to the above method where polymer (P) is a polyurethane or polyurethane co-polymer polymerized from at least one monomer (A) comprising a photoinitiator moiety (PI), at least one monomer (B) comprising a dye moiety (DYE), and optionally one or more additional monomers (C, D), wherein each of said monomers have attached two polymerizable functional groups at least two of which are selected to form a urethane bond upon polymerization. Further details about polymer (P) in relation to this method can especially be found in the section "Polymer (P)" in the second subsection relating to polyurethanes.

The amount of monomers (A), (B) and the optional (C) and (D), in the polymer (P) of the invention, can be expressed as a weight ratio. Typically, the weight ratio of the one or more monomers (A) may be: (A):{(B)+(C)+(D)} in a range of 0.5:99.5-15:85, preferably in a range of 1:99-12:88. Typically, the weight ratio of the one or more monomers (B) may be: (B):{(A)+(C)+(D)} in a range of 0.5:99.5-80:20, preferably in a range of 1:99-30:70. The weight ratio of the monomers will depend on the actual photoinitiator or dye moiety present, for example has a number of dye moieties a quite high molecular weight and the upper limit of the weight ratio of monomer (B) is therefore higher than for monomer (A).

The features, details and preferred embodiments herein described in connection with polymer (P) according to the invention applies mutatis mutandis in connection with the method of the invention for the manufacture of a polymer (P), and vice versa.

More than one type of monomer (A) and more than one type of monomer (B) may be used in the polymers (P) of the invention. As well as the regular structure . . . ABABABAB . . . , the polymers (P) may therefore also have a structure which incorporates variations of monomers A and B, e.g. . . . A'BABA'B'A'B'A'BABA'B' . . . .

In the same manner, more than one type of monomer (C) and/or more than one type of monomer (D) may be used in the polymers (P) of the invention. As well as the regular structure . . . ABCDABCDABCD . . . , the polymeric photoinitiators may therefore also have a structure which incorporates variations of monomers C and D, e.g. . . . ABC'DABCD'ABC'D' . . . .

At least one of the additional monomers (C) may be selected from the group consisting of polyethylene glycol (PEG), polypropylene glycol (PPG), random and block poly(ethylene glycol)-poly(propylene glycol) copolymers, poly(tetramethylene glycol) (PTMG), poly(1,4-butanediol adipate), poly(ethanediol 1,4-butanediol adipate), poly(caprolacton) diol, poly(1,6-hexanediol carbonate) and poly(ethylene terephthalate) diol.

At least one of the additional monomers (D) may be selected from the group consisting of: 1,4-phenylene diisocyanate (PPDI), toluene diisocyanate (TDI) as both its 2,4 and 2,6 isomers, methylene diphenyl diisocyanate (MDI) as both its 4,4' and 2,4' isomers, 1,5-naphthalene diisocyanate (NDI), 3,3'-bitolylene-4,4'-diisocyanate (TODI), 1,3-xylylenediisocyanate (XDI), tetramethyl-m-xylidene diisocyanate (TMXDI), 1,6-hexamethylene diisocyanate (HDI), isophorone diisocyanate (IPDI), bis(4-isocyanatocyclohexyl)methane (HMDI), and 2,2,5-trimethylhexane diisocyanate (TMHDI), 1,4-cyclohexane diisocyanate (CHDI), and 1,3-bis(isocyanato-methyl)cyclohexane (HXDI).

The polymerization step (d.) suitably takes place by means of heating.

Synthesis—End-Functionalized Polymer (P)

When end-functionalized polymers (P) are to be prepared the above described method with steps a. to d. includes a further step e.:

e. end-functionalizing the ends of the polymer (P) with optionally-substituted acryloyl groups.

End-functionalization of the polymer (P) with acryloyl groups can be carried out in a number of ways. For instance, if the polymer is a polyurethane, it is possible to carry out the polymerization in the presence of an excess of polyisocyanate, so that chain propagation stops when both ends of the polyurethane comprise isocyanate groups. In a further step, this polyurethane which is end-functionalized with isocyanate groups may be reacted with an acryloyl-containing moiety such as an acrylate ester in which the ester functionality is substituted with a hydroxyl-group (e.g. $H_2C$=CH—C(=O)—PEG-OH, in which PEG is polyethylene glycol)

In general, suitable "functional handles" need to be present as end-groups on the polymer chain in order to derivatize with acryloyl groups. Some retrosynthetic routes for synthesizing keto-, ester, amide and similar groups are exemplified in Scheme 1.

Scheme 1

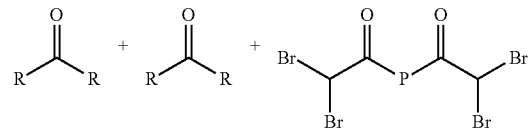

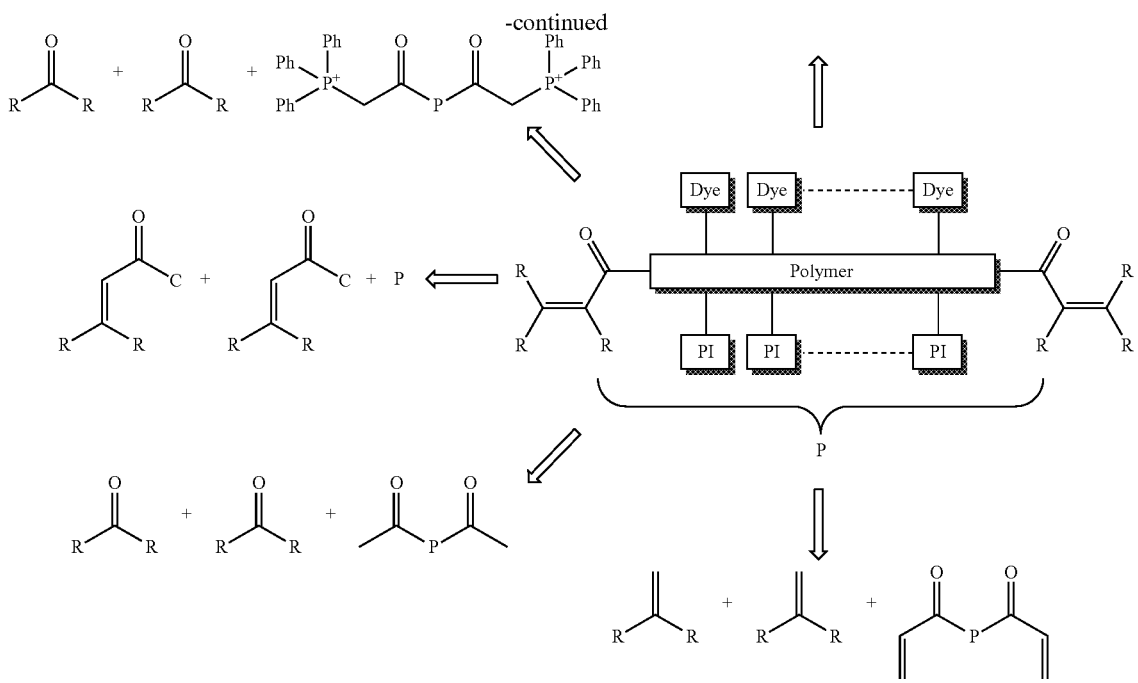

Though several routes exists for end-functionalizing a polymer with suitable acryloyl groups, the main aim is to have a polymer end-functionalized with suitable nucleophilic groups, e.g. alcohols as the end groups. In the case of a polyurethane, this is achieved by having an excess of a diol present as the monomer. In general, step-growth polymerizations are possible routes for achieving polymers end-functionalized with suitable nucleophilic groups. Another example is the synthesis of nylons, where a diacid chloride is reacted with a dialcohol: an excess of the dialcohol leaves predominately a polymer end-functionalized with alcohols.

Polyethers can for example be prepared with alcohol functionalities in both ends by utilizing an anionic polymerization route with hydroxide ions as initiators and quenching the reaction with water. Using ammonia or an amine as the initiator should result in an amine functionality as one of the end-groups, whereas the other end-group could be an alcohol by quenching the reaction mixture with water. A polymer with alcohols as the end-groups can be reacted with acetyl chloride or a longer aliphatic acid chloride. The resulting polymer, now end-functionalized with ester moieties, can then be condensed with ketones to provide the desired polymer end-functionalized with acryloyl groups.

Another possibility is to react the dialcohol-functionalized polymer with acryloyl chloride, which subsequently can be further reacted with alkenes in a metathesis reaction with ruthenium-based catalysts to provide a polymer end-functionalized with acryloyl groups.

Synthesis of Monomers of Formula (I)

Monomers (A) of formula (I) can be readily synthesised by a number of methods, for example:

Method I comprises the steps of:
a. providing a photoinitiator compound of general formula (VIII) containing a primary amine moiety:

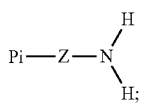

(VIIIa)

b. providing two alkylating agents, which may be the same or different, of general formulas (IXa) and (IXb):

$$LG\text{-}X_1\text{—}W_1 \quad \text{(IXa)},$$

$$LG\text{-}X_2\text{—}W_2 \quad \text{(IXa); and}$$

c. reacting said photoinitiator compound (VIII) from step a. with the alkylating agents (IXa) and (IXb) from step b. either simultaneously or consecutively such that both groups —$X_1$—$W_1$ and —$X_2$—$W_2$ of the two alkylating agents (IXa) and (IXb) become covalently linked to the primary amine moiety in the photoinitiator compound thus forming a tertiary amine photoinitiator monomer (A) of formula (I);

wherein in the formulas (VIII), (IXa) and (IXb) Pi, Z, $X_1$, $X_2$, $W_1$, and $W_2$ are as defined above.

The first method is typically a nitrogen alkylation reaction, carried out in polar solvents such as tetrahydrofuran, dioxane, dimethylformamide or alcohols such as methanol, ethanol or isopropylalcohol at temperatures typically ranging from 50° C. to 120° C.

Method II comprises the steps of:
a. providing a photoinitiator compound of general formula (VIIIb) containing a secondary amine group:

b. providing an alkylating agent of general formula (IXb):

$$LG\text{-}X_2\text{—}W_2 \quad \text{(IXb); and}$$

c. reacting said photoinitiator compound (VIIIb) from step a. with the alkylating agent (IXb) from step b. such that the secondary amine moiety of (VIIIb) displaces the leaving group in the alkylating agent compound (IXb) thus forming a tertiary amine photoinitiator monomer (A) of formula (I);

wherein in the formulas (VIIIb) and (IXb) Pi, Z, $X_1$, $X_2$, $W_1$, and $W_2$ are as defined above.

The second method is typically a nitrogen alkylation reaction, carried out in polar solvents such as tetrahydrofuran, dioxane, dimethylformamide or alcohols such as methanol, ethanol or isopropylalcohol at temperatures typically ranging from 50° C. to 120° C.

Method III comprises the steps of:

a. providing a photoinitiator compound of general formula (VIIIc) containing a leaving group:

Pi-Z-LG                        (VIIIc);

b. providing a secondary amine of general formula (Xa):

and c. reacting said photoinitiator compound (VIIIc) from step a. with the secondary amine from step b. such that the secondary amine moiety of (Xa) displaces the leaving group in the photoinitiator compound (VIIIc) thus forming a tertiary amine photoinitiator monomer (A) of formula (I);

wherein in the formulas (VIIIc) and (X), Pi, Z, $X_1$, $X_2$, $W_1$, $W_2$ and LG are as defined above.

The third method is typically a nitrogen alkylation reaction. This reaction is typically carried out in polar solvents such as tetrahydrofuran, dioxane, dimethylformamide or alcohols such as methanol, ethanol or isopropylalcohol at temperatures typically ranging from 50° C. to 120° C.

Method IV comprises the steps of:

a. providing a photoinitiator compound of general formula (VIIId) containing a leaving group:

Pi-LG                          (VIIId);

b. providing nucleophilic reagent of general formula (Xb):

and c. reacting said photoinitiator compound (VIIId) from step a. with the nucleophilic reagent from step b. such that a nucleophilic moiety of reagent (Xb) displaces the leaving group in the photoinitiator compound (VIIId) thus forming a tertiary amine photoinitiator monomer (A) of formula (I);

wherein in the formulas (VIIId) and (Xb) Pi, Z, $X_1$, $X_2$, $W_1$, $W_2$ and LG are as defined above.

The fourth method is typically a nucleophilic aromatic substitution reaction. This reaction is typically carried out in polar solvents such as tetrahydrofuran, dioxane, dimethylformamide or in bulk at temperatures typically ranging from 80° C. to 150° C.

Synthetic methods I, II, III and IV are shown in Scheme 2:

Scheme 2

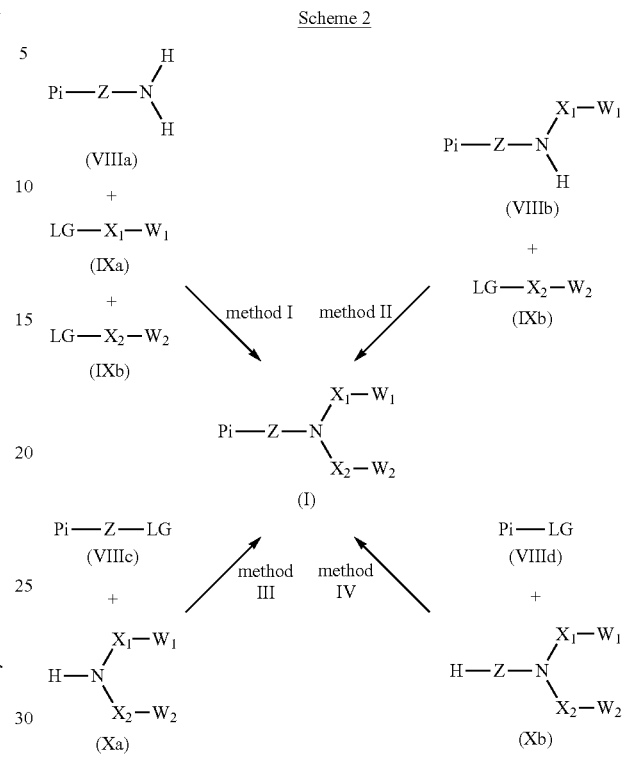

Synthesis of Monomers Formula (II)

Monomeric quaternary ammonium photoinitiators of Formula (II) can be readily synthesised by a number of methods, for example:

The first method comprises the steps of a. providing a photoinitiator compound of general formula (I) containing a tertiary amine moiety:

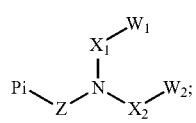

b. providing an alkylating agent of formula (XIa):

LG-$R^7$                        (XIa); and c. reacting said photoinitiator compound (I) from step a. with the alkylating agent (XIa) from step b. such that the tertiary amine moiety of the photoinitiator compound becomes covalently linked to the group $R^7$ from the alkylating agent thus forming a quaternary ammonium salt of formula (II);

wherein in the formulas (I) and (XIa) Pi, Z, $R^7$, $X_1$, $X_2$, $W_1$, and $W_2$, are as defined for general formula (II) herein, and LG is a leaving group forming $X^-$ of formula (II).

The first method is typically a nitrogen alkylation reaction, carried out in polar solvents such as tetrahydrofuran, dioxane, dimethylformamide or alcohols such as methanol, ethanol or isopropylalcohol at temperatures typically ranging from 50° C. to 120° C.

The second method comprises the steps of:

a. providing a photoinitiator compound of general formula (VIIIc) containing a leaving group:

Pi-Z-LG                        (VIIIc);

b. providing a tertiary amine of general formula (Xc):

and c. reacting said photoinitiator compound (VIIIc) from step a. with the tertiary amine (Xc) from step b. such that the tertiary amine moiety of (Xc) displaces the leaving group in the photoinitiator compound (VIIIc) thus forming a quaternary ammonium salt of formula (II);

wherein in the formulas (VIIIc) and (Xc) Pi, Z, $R^7$, $X_1$, $X_2$, $W_1$, and $W_2$, are as defined for general formula (II) herein, and LG is a leaving group forming $X^-$ of formula (II).

The second method is typically a nitrogen alkylation reaction, carried out in polar solvents such as tetrahydrofuran, dioxane, dimethylformamide or alcohols such as methanol, ethanol or isopropylalcohol at temperatures typically ranging from 50° C. to 120° C.

The third method comprises the steps of a. providing a photoinitiator compound of general formula (VIIIe) containing a secondary amine moiety:

Pi-Z—NH—$R^7$ (VIIIe);

b. providing two alkylating agents, which may be the same or different, of general formulas (IXa) and (IXb):

and

c. reacting said photoinitiator compound (VIIIe) from step a. with both alkylating agents from step b. either simultaneously or consecutively such that both groups —$X_1$—$W_1$ and —$X_2$—$W_2$ of the two alkylating agents become covalently linked to the secondary amine moiety in the photoinitiator compound thus forming a quaternary ammonium salt of formula (II);

wherein in the formulas (VIIIe), (IXa), and (IXb), Pi, Z, $R^7$, $X_1$, $X_2$, $W_1$, and $W_2$, are as defined for general formula (II) herein, and LG is a leaving group, forming $X^-$ of formula (II).

The third method is typically a nitrogen alkylation reaction. This reaction is typically carried out in polar solvents such as tetrahydrofuran, dioxane, dimethylformamide or alcohols such as methanol, ethanol or isopropylalcohol at temperatures typically ranging from 50° C. to 120° C.

Synthetic methods one, two and three are shown in Scheme 3:

Scheme 3:

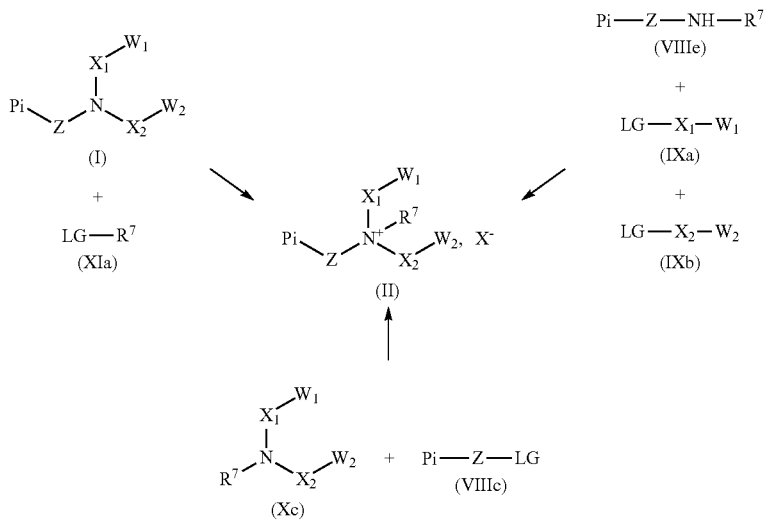

Polymerization with Monomers (A) of Formula (I) or (II)
Description of Polymerization Conditions:

Polyurethanes, polythiourethanes and polydithiourethanes are typically prepared from their respective monomers in solvents or in bulk. For solvent-based procedures, the typical solvents include tetrahydrofuran, toluene and chlorobenzene at temperatures ranging from 20° C. to 100° C. Catalysts such as dibutyltin dilaurate (DBTDL) or 1,4-diazabicyclo[2.2.2]octane (DABCO) may be used to accelerate the reactions. Under bulk conditions, all components are reacted without solvent as a homogeneous reaction melt at temperatures typically between 50° C. to 120° C. Polyureas and polythioureas are typically prepared by analogous solvent-based or bulk procedures, but no catalyst is required since the polymerization is typically very rapid at temperatures ranging from 20° C. to 100° C.

Polyesters are typically prepared from their respective monomers in solvents such as toluene or xylenes in the presence of strong acid catalysts and with azeotropic removal of water or low molecular weight aliphatic alcohol by-product. Typical temperatures range from 80° C. to 150° C.

Polycarbonates are typically prepared in a solvent such as dichloromethane using a tertiary amine catalyst, while maintaining pH via the addition of NaOH. A melt transesterification process can also be used, which involves base-catalyzed reaction of a diol with diphenyl carbonate.

Polyphosphonites, polyphosphonates and polyphosphates are typically prepared from the appropriate phosphorusbased reagents bearing —PCl$_2$, —P(=O)Cl$_2$ or —O—P(=O)Cl$_2$ function group, respectively, and a diol. The reactions can be conveniently carried out in aromatic solvents such as toluene at temperatures ranging from 0° C. to 80° C. in the presence of tertiary amines.

A general scheme for the formation of polyurethanes using monomers (A) of Formula (I) is shown in Scheme 4 below:

Scheme 4:

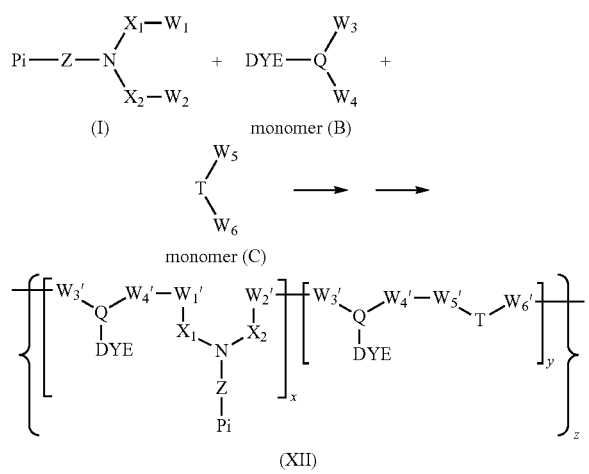

In Scheme 4, the monomer (A) of Formula (I) and monomers (B) and (C), and the preferred embodiments thereof are as described herein above. Formula (XII) is an example of a polymer (P) of the invention formed by co-polymerization of these monomers. This method is preferably used in formation of a polyurethane and/or a polyurethane co-polymer.

Scheme 5 is a general scheme for the formation of polymeric photoinitiators of the invention, using monomers (A) of formula (II):

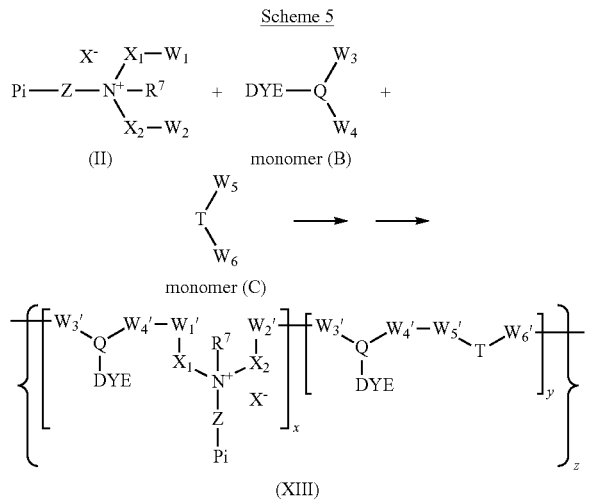

In Scheme 5, formula (II), monomer (B) and (C), and preferred options thereof are as described herein above. Formula (XIII) is an example of a polymer (P) of the invention formed by co-polymerization of these monomers.

x, y, z represent the repetitions of the monomers. This method provides cationic polymers (P) according to the invention, where all photoinitiator monomer units carry a quaternary ammonium moiety.

As set out above in Schemes 4 and 5, the monomers are incorporated into the polymer chain, as the end groups $W_1$, $W_2$, $W_5$ and $W_6$ react with the end groups $W_3$, $W_4$ of other monomers. The nomenclature $W_1'$, $W_2'$, $W_3'$, $W_4'$, $W_5'$ and $W_6'$ depict the corresponding end groups $W_1$-$W_6$ after being reacted.

End groups $W_3$, $W_4$, $W_5$, $W_6$ are independently selected from the same end groups as $W_1$ and $W_2$. $W_3$ and $W_4$ are selected so as to be complementary to $W_1$, $W_2$, $W_5$ and $W_6$, so that urethane and urethane-like chains are formed. For instance, if the end groups $W_1$, $W_2$, $W_5$ and $W_6$ comprise alcohol, amine or thiol groups, suitable $W_3$ and $W_4$ will comprise isocyanate or isothiocyanate groups, and vice-versa.

The photoinitiator moiety therefore becomes pendant from the polymer backbone. As such, it is not able to leach from the polymer matrix. In addition, radical bond-forming reactions between the photoinitiator moiety and other components of the polymerization mixture will cause cross-linking, rather than forming undesirable low molecular weight compounds.

Additional monomers may be introduced into the polyurethane according to the above scheme, as desired by the person skilled in the art. For example, monomer (C) may be a PEG and hence a polyurethane polyether copolymer is formed.

Free Radical Polymerization of Polyacrylates

Polyacrylates also known as acrylic polymers are prepared by radical or anionic polymerization of carbon-carbon double bonds in monomer units of general formula $CR_2$=CR—COOR, $CR_2$=CR—CONR$_2$ or $CR_2$=CR—CN. During this reaction, the n-bonds between the carbon atoms of the acrylic moiety are converted into a linear of chain carbon-carbon single bonds of the polymer backbone.

Anionic polymerization of acrylic monomers is typically effected with catalytic amounts of organolithium compounds, alkoxyalkoxides and lanthanoid metallocene compounds (J. M. S.—Rev. Macromol. Chem. Phys., 1994, C34, pp. 243-324). Typical suitable solvents are tetrahydrofuran (THF), toluene or ethylbenzene at temperatures in the range from −30° C. to 80° C., the range from −20° C. to 50° C. being preferred.

Radical polymerization of acrylic monomers is typically initiated with catalytic amounts of a thermally labile substance that decomposes under the reaction conditions to generate reactive radicals. Typical radical initiators are azo compounds such as 2,2'-azobis(isobutyronitrile) or organic peroxo compounds such as benzoyl peroxide. Suitable solvents include methanol, ethanol, benzene and THF at temperature between 50° C. to 120° C.

Another way to conduct polymerization of acrylic monomers is the use of copper(I) chloride of copper(I) bromide catalysts in the presence of an alkyl bromide initiator such as ethyl 2-bromo-2-methylpropionate and amine based ligand such as N,N,N',N,N-pentamethyldiethylenetriamine. Suitable solvents are water, methanol, toluene, 1,4-dioxane and acetonitrile at temperatures from 20° C. to 100° C.

Scheme 6 is a general scheme for the formation of acrylic polymers of the invention:

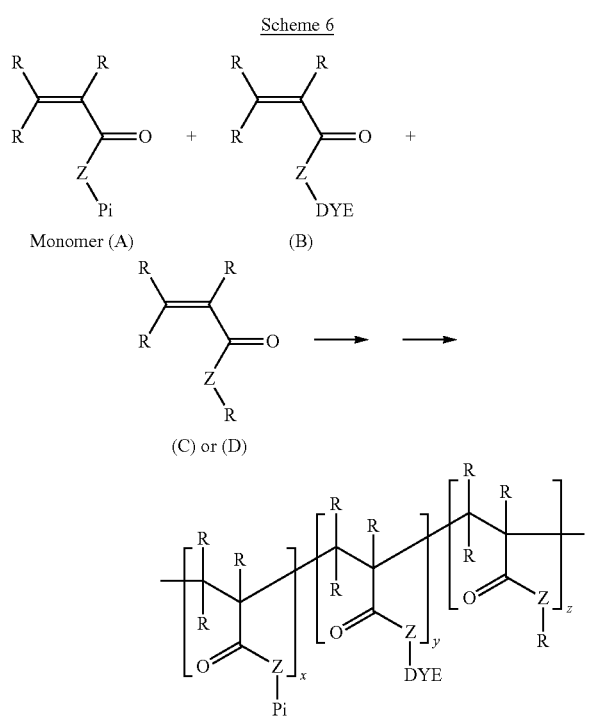

Scheme 6

Curing

Due to the presence of the photoinitiator moieties (PI), the polymers (P) of the invention can be cross-linked by exposure to UV radiation. Cross-linking means that bonds are formed between adjacent polymer strands, in a radical process promoted by the photoinitiator moieties (PI). Additionally, when the polymer (P) of the invention furthermore is end-functionalized with optionally substituted acryloyl groups, the polymer may further cross-link via the acryloyl moieties which are activated by the photoinitiator induced radical process. After cross-linking, the polymer becomes substantially insoluble in many solvents, including water; this is due to the formed three dimensional network. In this case, by "substantially" is meant that the cross-linked polymer is less soluble than the polymer prior to the cross-linking, and in many cases the cross-linked polymer is insoluble.

In the present context, the terms "photo-curing", "photo-cure", "cross-linking" and the like refer to curing by means of UV radiation. The UV radiation may be applied by means of a polychromatic or monochromatic UV source, preferably with high intensity and with an emission spectrum that matches the absorbance spectrum of the photoinitiator(s) as well as possible. In the absence of reactive monomers, the cross-linking of the polymer (P) takes place only by the bimolecular combination of radicals derived from the UV irradiated photoinitiators. A high light intensity is preferred. Suitable polychromatic light sources include: (i) deuterium lamps, (ii) mercury lamps, possibly doped with iron, gallium or other elements that significantly affects the output spectrum, (iii) xenon arc lamps, both pulsed and unpulsed, and (iv) halogen lamps (emit mainly visible light). Suitable monochromatic light sources include: (v) gas and solid state lasers (possibly frequency doubled, tripled, quadrupled or in other ways frequency manipulated), both pulsed and unpulsed, and (vi) light emitting diodes in the UV and visible area, both pulsed and unpulsed.

An optimal irradiation period and light intensity can easily be found by the skilled person by routine experiments. For practical reasons (e.g. in the large scale production of the polymer), the irradiation period should preferably not exceed 300 sec, and in particular should not exceed 600 sec.

The present invention therefore relates to a cross-linked polymer (P'), obtained from UV irradiation of the polymer (P) or the polymer (P) being end-functionalized.

Ink

Due to the dye moiety, the polymers of the invention may be used as inks. The combination of dye moiety and photoinitiator moiety provides inks which can be cross-linked so as to reduce their solubility.

The fourth aspect of the invention relates to an ink comprising at least one polymer (P), and a solvent. It is possible to vary the properties of the ink (e.g. colour, fastness) by including more than one polymer (P); however, for the sake of economy, the ink of the invention preferably consists of one type of polymer (P). Additionally, the fourth aspect of the invention relates to an ink comprising at least one polymer (P) being end-functionalized with optionally substituted acryloyl groups, and a solvent.

The solvent may be an organic solvent, an aqueous solvent, or mixtures thereof. Preferably the solvent is water or $C_1$-$C_5$ alkyl alcohols, most preferably water.

The ink may be a solution of polymer (P) in said solvent. Alternatively, the ink may be an emulsion of the polymer (P) in said solvent (i.e. two liquids which are immiscible). As a further alternative, the ink may be a dispersion of the polymer (P) in said solvent (i.e. particles of the polymer (P) are suspended in the solvent).

Inks according to the invention are suitable for use in ink-jet printers, in which droplets of ink are forced from a printing nozzle (usually by means of an electrostatic charge on each droplet) onto a substrate. The polymer (P) of the present invention may be dissolved in a suitable solvent such as water, aliphatic alcohols, tetrahydrofuran, or methyl ethyl ketone and applied as inks for drop-on-demand inkjet printing. When applied in this manner, the Ink suitably has low viscosity and therefore either low polymer molecular weight or the polymer is in a low concentration in the solvent (Advanced Materials 2004, 16, No. 3, 203-213). For polymer concentrations of 10-1 wt % in the inkjet ink, the suitable molecular weight of the polymer is between 5 kDa and 50 kDa, more suitably between 10 kDa and 40 kDa. For polymer concentrations of 1-0.1 wt % in the inkjet ink, the suitable molecular weight of the polymer is between 50 kDa and 500 kDa.

The ink in said solvent will suitably have a total solids content of from about 0.1 to 75 wt %; preferably from 1 to 50 wt %, more preferably from 2 to 25 wt %. The ink preferably has a viscosity measured at 25° C. of 50 to 5000 mPa s, preferably 100 to 500 mPa s.

Additionally, in the second aspect of the invention the presence of acryloyl groups allows the polymer to have a low molecular weight, and thus a low viscosity.

The polymers of the invention can also be printed onto a substrate without the use of a solvent; e.g. in powder form. A fifth aspect of the invention therefore provides an ink comprising the polymer (P), wherein the polymer (P) is in powder form.

Additionally, the fifth aspect of the invention relates to an ink comprising at least one polymer (P) being end-functionalized with optionally substituted acryloyl groups, wherein said polymer (P) is in powder form.

Polymers of the present invention may also be used as hot melt inks for continuous jet printing. When applied in this manner, the polymer molecular weight is suitably between 1 kDa to 10 kDa. This in order to have the ink liquefying below the decomposition temperature.

The invention additionally provides a printer cartridge comprising the ink of the invention. Typically, a printer will comprise three cartridges of primary colours, and optionally one of black ink (the so-called "CMYK" colour model: cyan, magenta, yellow, and key (black)).

The invention therefore provides a method for printing on a substrate, said method comprising the steps of:
a. providing an ink according to the invention;
b. applying said ink to said substrate; and
c. exposing the ink to UV radiation so as to cross-link the polymer (P).

In addition, the invention provides a printed substrate obtainable through the method described herein. The printed substrates can be analysed and distinguished from known inks through chemical or spectrographic methods, to establish whether the polymer in the ink comprises covalently-bound dye moities and covalently-bound photoinitiator moieties.

EXAMPLES

Preparatory Example 1

4-{3-[bis(2-hydroxyethyl)amino]propoxy}benzophenone dichloromethane (300 mL) and extracted with water (3×100 mL). The organic phase was separated, evaporated, the light brown oily residue dried in vacuo to give crude 4-(3-iodopropoxy)benzophenone (light brown solid; 83.2 g).

To the crude product from the previous step (83.2 g; 227.2 mmol) was added toluene (100 mL), 2-propanol (200 mL) and diethanolamine (179.2 g; 1.704 mol). The reaction mixture was refluxed (110° C.) for 16 h. After evaporation of ethanol and toluene, water (2000 mL) was added to precipitate the oily product. The emulsion obtained was thoroughly extracted with diethyl ether (6×300 mL). The aqueous phase was discarded and the organic phase was extracted with hydrochloric acid (6M, 3×200 mL). The pH of the strongly acidic aqueous phase was adjusted to 12-13 by slow addition of 35% aq. ammonia to reprecipitate the product. The aqueous phase was reextracted with dichloromethane (3×300 mL), the organic phase dried (MgSO$_4$), evaporated and the light brown oily product dried in vacuo.

This provides 4-{3-[bis(2-hydroxyethyl)amino]propoxy}benzophenone (57.7 g; 74% yield).

1H-NMR (400 MHz, chloroform-d): 7.80 (d, J=8.8 Hz, 2H), 7.73 (d, J=8.3 Hz, 2H), 7.55 (m, 1H), 7.46 (t, J=7.8 Hz, 2H), 6.95 (d, J=8.8 Hz, 2H), 4.12 (t, J=6.0 Hz, 2H), 3.62 (t, J=5.3 Hz, 4H), 2.87 (bs, 2H), 2.75 (t, J=6.9 Hz, 2H), 2.67 (t, J=5.3 Hz, 4H), 1.96 (apparent quintet, J=6.4 Hz, 2H). UV (MeCN): $\lambda_{max}$=286 nm.

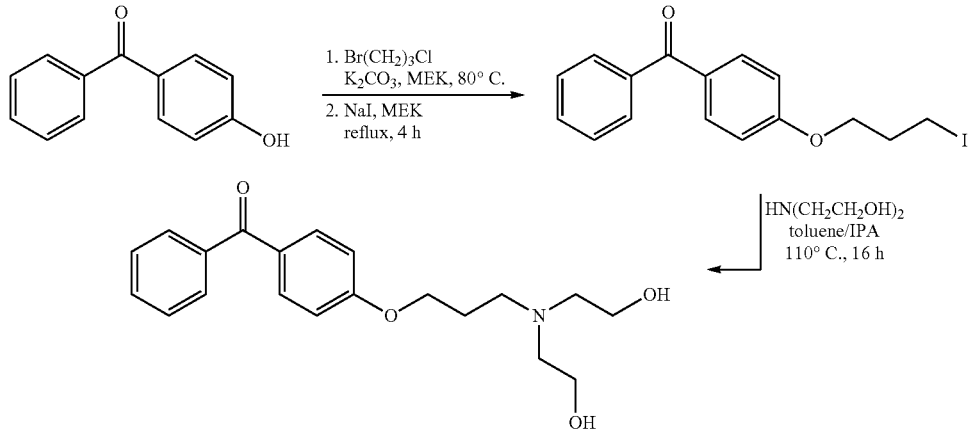

RELEVANT LITERATURE: J. Med. Chem. 2001, 3810-3820; J. Med. Chem. 1998, 3976-3986; J. Med. Chem. 1989, 105-118.

A 1000 mL three-neck flask was charged with 4-hydroxybenzophenone (50.00 g; 252.2 mmol), 1-bromo-3-chloropropane (79.41 g; 504.4 mmol) and 2-butanone (500 mL). After flushing with nitrogen, anhydrous potassium carbonate (104.6 g; 756.5 mmol) was added and the reaction mixture was stirred at reflux for 24 h. Full consumption of the starting 4-hydroxybenzophenone was confirmed by TLC. The reaction mixture was filtered, the filtrate evaporated, the oily residue dissolved in dichloromethane (300 mL) and extracted with water (3×100 mL). The organic phase was separated, evaporated, and the unreacted 1-bromo-3-chloropropane was removed by heating to 70° C. in vacuo. The residue was dissolved in 2-butanone (500 mL) and sodium iodide (45.36 g; 302.6 mmol) was added. The reaction mixture was refluxed for 6 h. The reaction mixture was filtered, the filtrate evaporated, the oily residue dissolved in Large Scale Prep:

A 5000 mL three-neck flask was charged with 4-hydroxybenzophenone (800.0 g; 4.036 mol), 1-bromo-3-chloropropane (832.5 g; 5.288 mol) and 2-butanone (3300 mL). Anhydrous potassium carbonate (673.6 g; 4.874 mol) was added and the reaction mixture was stirred at reflux for 100 h. Full consumption of the starting 4-hydroxybenzophenone was confirmed by HPLC. The reaction mixture was filtered, the inorganic solids were washed with 2-butanone (3×100 mL). The filtrate was evaporated, and the unreacted 1-bromo-3-chloropropane was removed by heating to 70° C. in vacuo. The residue was dissolved in acetonitrile (2000 mL) and sodium iodide (650.0 g; 4.337 mol) was added. The reaction mixture was refluxed for 8 h. The reaction mixture was filtered to give a solution of crude 4-(3-iodopropoxy)benzophenone.

The crude acetonitrile solution from the previous stage was charged over a period of 6 hours into neat diethanolamine (2800 g; 26.63 mol) heated to 70° C. After the end of the feed, the reaction mixture heated to reflux for a further 2 h. Full consumption of the starting material was confirmed by TLC. The reaction mixture was poured into water (10 L) and the resulting suspension extracted with dichloromethane (3×1500 mL). The organic phase was separated and extracted with 1 M aq. HCl (4000 mL). The organic phase was discarded and the aqueous phase was made strongly alkaline (pH 12) by slow addition of 50% aq. NaOH. The resulting suspension was extracted with dichloromethane (3×1000 mL). The organic layer was dried (MgSO₄), filtered and evaporated. The light brown oil was dried in high vacuo at 80° C. This provides 4-{3-[bis(2-hydroxyethyl)amino] propoxy}benzophenone (1180 g; 85.1% yield over 3 steps).

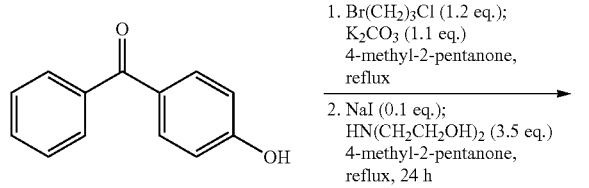

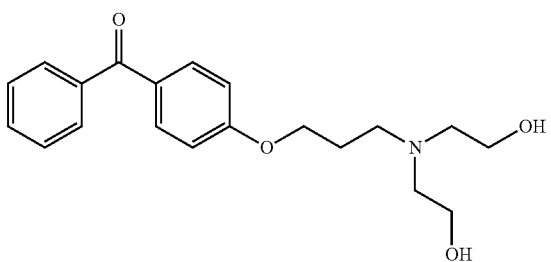

Procedure:

A 500 mL three-neck flask was charged with 4-hydroxybenzophenone (80.00 g; 0.4036 mol), 1-bromo-3-chloropropane (76.25 g; 0.4843 mol) and 4-methyl-2-pentanone (330 mL). Anhydrous potassium carbonate (61.36 g; 0.4440 mol) was added and the reaction mixture was stirred at reflux (120° C.) for 4 h. HPLC analysis shows that the reaction mixture contains 90.0% 4-(3-chloropropoxy)benzophenone; 7.0% 1,3-bis(4-benzoylphenoxy)propane and 0.8% 4-hydroxybenzophenone. The reaction mixture was filtered hot and the inorganic solids were washed with 4-methyl-2-pentanone (100 mL). The filtrate was charged into a mixture of diethanolamine (148.5 g; 1.412 mol), sodium iodide (6.05 g; 0.0404 mol) and 4-methyl-2-pentanone (150 mL). The reaction mixture heated to reflux (122° C.) for 24 h. The reaction mixture was cooled to room temperature and extracted with water (500 mL). The organic phase was extracted with 1 M HCl (500 mL) at 70° C. to prevent crystallisation of the 1,3-bis(4-benzoylphenoxy)propane byproduct. The aqueous phase was separated, cooled to room temperature and taken to pH 12 with 50% aqueous NaOH. The resulting emulsion was extracted with 4-methyl-2-pentanone (3×200 mL). The organic phase was separated, dried (MgSO₄), filtered and the solvent removed in vacuo. This provides 4-{3-[bis(2-hydroxyethyl)amino] propoxy}benzophenone (123.2 g; 89% yield over 3 steps).

Preparatory Example 2

4-{[bis(2-hydroxyethyl)amino]methyl}benzophenone

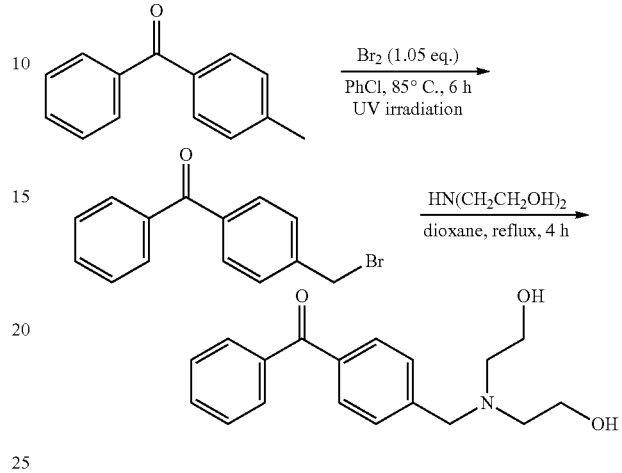

RELEVANT LITERATURE: Tetrahedron 2009, 4429-4439.

A 5000 mL three-neck flask was charged with 4-methylbenzophenone (1100 g; 5.605 mol). The starting material was dissolved in chlorobenzene (2500 mL) and the reaction mixture warmed to 75° C. A solution of bromine (302 mL; 5.886 mol) in chlorobenzene (500 mL) was added to the reaction vessel in 100 mL portions over 6 hours. The reaction temperature was maintained at 85° C. and the reaction vessel was irradiated with a 240 W incandescent bulb. Hydrogen bromide gas evolved during the reaction was neutralised with an aqueous KOH scrubber system. After complete disappearance of orange coloration, the reaction mixture was cooled to ambient temperature and all volatiles removed in vacuo. The residue was dried under oil pump vacuum for 4 h at 60° C. Pale yellow-orange solid was obtained upon cooling (1500 g). 1H-NMR indicates that the crude product contains 20% 4-methylbenzophenone, 71% 4-(bromomethyl)benzophenone and 9% 4-(dibromomethyl) benzophenone. The crude product was used directly in the next step.

A 10000 mL three-neck flask was charged with diethanolamine (4400 g; 41.85 mol). After warming to 90° C., a slurry of crude material from the previous step (1500 g) in dioxane (2000 mL) was added to the oily reaction mixture in 6 portions over a period of 2 hours. After the addition was complete, the reaction was taken to gentle reflux (100° C.) and heated for a further 2 hours. Complete conversion of 4-(bromomethyl)benzophenone was confirmed by TLC. Dioxane was removed from the reaction by evaporation under reduced pressure. The oily orange residue was poured into water (20 L) and extracted with ethyl acetate (3×1500 mL). The aqueous phase was discarded and the organic phase was extracted with hydrochloric acid (1.2M, 3×1000 mL). The pH of the strongly acidic aqueous phase was adjusted to 12-13 by slow addition of 50% aq. NaOH to reprecipitate the product. Most of the product separated out as an orange oil. The residual aqueous phase was reextracted with dichloromethane (3×500 mL), combined organic phases were dried (Na₂SO₄), volatiles were evaporated under reduced pressure and the light brown oily product dried under oil pump vacuum (6 h, 60° C.).

This provides 4-{[bis(2-hydroxyethyl)amino]methyl}benzophenone (1170 g; 70.0% yield over 2 steps).

1H-NMR (400 MHz, chloroform-d): 7.80-7.75 (m, 4H), 7.58 (tt, J=7.4, 1.4 Hz, 1H), 7.50-7.44 (m, 4H), 3.79 (s, 2H), 3.65 (t, J=5.4 Hz, 4H), 2.74 (t, J=5.4 Hz, 4H), 2.59 (bs, 2H). UV (MeCN): $\lambda_{max}$=255 nm.

Preparatory Example 3

{4-[bis(2-hydroxyethyl)amino]phenyl}(phenyl)methanone

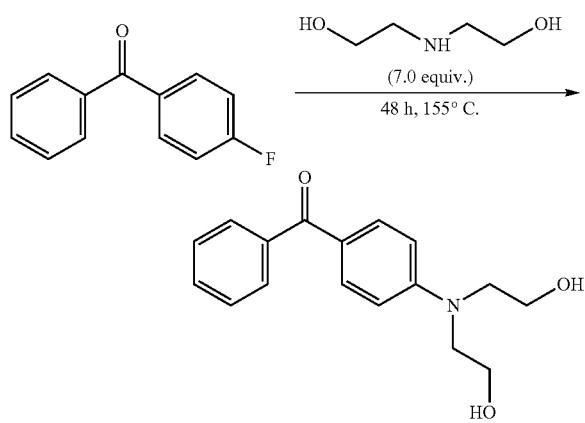

RELEVANT LITERATURE: J. Phys. Org. Chem. 2001, 14, 247-255; J. Med. Chem. 1991, 34, 1552-1560.

A 100 mL two-neck flask was charged with 4-fluorobenzophenone (15.0 g; 74.9 mmol) and diethanolamine (55.1 g; 524 mmol). The flask was flushed with nitrogen, fitted with a reflux condenser and heated to 155° C. for 48 h under a gentle stream of nitrogen. Complete conversion of the starting 4-fluorobenzophenone was confirmed by TLC. After cooling to ambient temperature, the dark viscous reaction mixture was poured into water (2000 mL). The resulting suspension was thoroughly extracted with diethyl ether (6×250 mL). The aqueous phase was discarded and the organic phase was extracted with hydrochloric acid (2M, 5×200 mL). The pH of the strongly acidic aqueous phase was adjusted to 12-13 by slow addition of 35% aq. ammonia to reprecipitate the product. The aqueous phase was then reextracted with dichloromethane (3×300 mL). The crude organic extract was purified by passing through a short silica gel column (eluent: ethyl acetate). The eluted yellow solution was evaporated and the oily residue dried in vacuo to provide {4-[bis(2-hydroxyethyl)amino]phenyl}(phenyl)methanone (yellow-brown solid; 13.176 g; 62% yield).

$^1$H-NMR (400 MHz, CDCl$_3$): 7.72 (d, J=10.0 Hz, 2H), 7.69-7.66 (m, 2H), 7.53 (tt, J=8.2, 1.4 Hz, 1H), 7.42 (t, J=8.3 Hz, 2H), 6.55 (d, J=10.0 Hz, 2H), 4.22 (bs, 2H), 3.43 (t, J=5.4 Hz, 4H), 3.20 (t, J=5.4 Hz, 4H).

Large Scale Prep:

A 2000 mL two-neck flask was charged with 4-fluorobenzophenone (200.0 g; 1.00 mol) and diethanolamine (735.2 g; 7.00 mol). The flask was flushed with nitrogen, fitted with a reflux condenser and heated to 155° C. for 48 h under a gentle stream of nitrogen. Complete conversion of the starting 4-fluorobenzophenone was confirmed by TLC. After cooling to ambient temperature, the dark viscous reaction mass was diluted with ethyl acetate (2500 mL) and extracted with water (2000 mL). The organic phase was dried (MgSO$_4$), filtered and evaporated to give {4-[bis(2-hydroxyethyl)amino]phenyl}(phenyl)methanone (bright yellow powder; 260 g; 91% yield).

Preparatory Example 4

4-{3-[bis(2-hydroxyethyl)amino]propoxy}-1-chloro-9H-thioxanthen-9-one

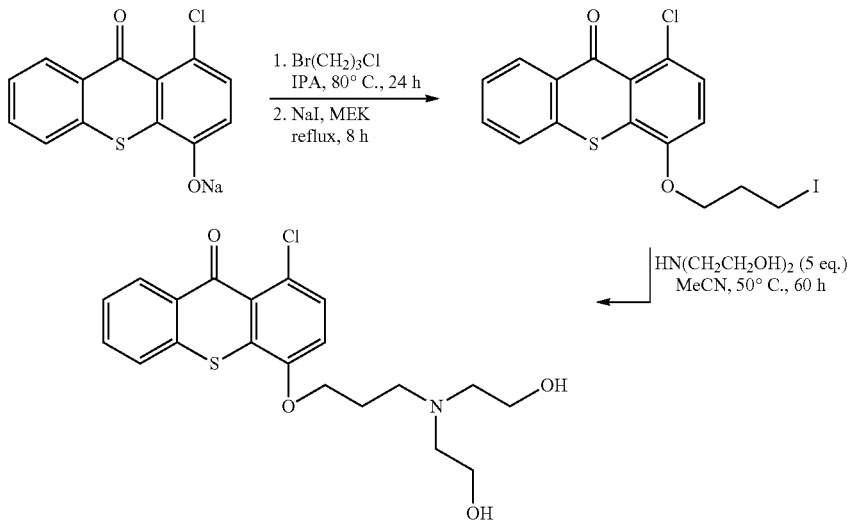

Small Scale Prep:

A 500 mL flask was charged with the sodium salt of 1-chloro-4-hydroxy-9H-thioxanthen-9-one (28.5 g; 0.100 mol), 1-bromo-3-chloropropane (17.4 g; 0.111 mol) and isopropyl alcohol (280 mL). The turbid reaction mixture was refluxed for 24 h. The hot solution was diluted with isopropyl alcohol (130 mL), drowned out in water (1400 mL) and the resulting suspension was extracted with dichloromethane (3×250 mL). The organic phase was separated, dried (MgSO$_4$), filtered and solvent removed in vacuo to give 1-chloro-4-(3-chloropropoxy)-9H-thioxanthen-9-one (24.4 g; 72% yield).

1-H NMR (400 MHz, CDCl$_3$): 8.39 (ddd, J=8.1, 1.5, 0.6 Hz, 1H), 7.54 (m, 1H), 7.48 (ddd, J=8.1, 1.4, 0.6 Hz), 7.41

(m, 1H), 7.33 (d, J=8.6 Hz, 1H), 6.92 (d, J=8.6 Hz, 1H), 4.23 (t, J=5.8 Hz, 2H), 3.83 (t, J=6.3 Hz, 2H), 2.32 (apparent quintet, J=6.0 Hz, 2H).

The crude product from the previous step (26.44 g; 77.94 mmol) was suspended in 2-butanone (250 mL) and sodium iodide (14.02 g; 93.52 mmol) was added. The reaction mixture was refluxed for 16 h. The reaction mixture was filtered, the solids were washed with boiling 2-butanone (2×50 mL), the filtrate evaporated, the oily residue dissolved in dichloromethane (300 mL) and extracted with water (2×100 mL). The organic phase was separated, evaporated and dried in vacuo to give crude 1-chloro-4-(3-iodopropoxy)-9H-thioxanthen-9-one (30.51 g; yellow solid; 91% yield).

1-H NMR (400 MHz, CDCl$_3$): 8.53 (dd, J=9.0, 1.4 Hz, 1H), 7.59 (m, 1H), 7.53 (dd, J=8.9, 1.5 Hz, 1H), 7.45 (m, 1H), 7.37 (d, J=9.6 Hz, 1H), 6.91 (d, J=9.6 Hz, 1H), 3.83 (t, J=6.3 Hz, 2H), 3.03 (t, J=7.4 Hz, 2H), 1.81 (apparent quintet, J=6.9 Hz, 2H).

Crude 1-chloro-4-(3-iodopropoxy)-9H-thioxanthen-9-one (10.0 g; 23.22 mmol) from the previous step was slowly charged into a solution of diethanolamine (14.65 g; 139.3 mmol) in acetonitrile (100 mL) heated to 50° C. The reaction mixture was stirred vigorously and heated to 50° C. for 60 h. The solvent was removed in vacuo and water (500 mL) was added. The mixture was extracted with dichloromethane (3×250 mL). The aqueous phase was discarded and the organic phase was extracted with hydrochloric acid (2M, 3×100 mL). The pH of the strongly acidic aqueous phase was adjusted to 12-13 by slow addition of 50% aq. NaOH to reprecipitate the product. The aqueous phase was reextracted with dichloromethane (4×100 mL), the organic phase dried (MgSO$_4$), evaporated to give 4-{3-[bis(2-hydroxyethyl)amino]propoxy}-1-chloro-9H-thioxanthen-9-one (5.31 g; 56% yield).

$^1$H-NMR (400 MHz, CDCl$_3$): 8.29 (ddd, J=8.1, 1.5, 0.6 Hz, 1H), 7.45 (ddd, J=8.2, 6.8, 1.4 Hz, 1H), 7.39 (ddd, J=8.1, 1.4, 0.6 Hz, 1H), 7.34 (ddd, J=8.2, 6.8, 1.4 Hz, 1H), 7.21 (d, J=8.6 Hz, 1H), 6.81 (d, J=8.6 Hz, 1H), 4.04 (t, J=6.1 Hz, 2H), 3.64 (bs, 2H), 3.59 (t, J=5.2 Hz, 4H), 2.73 (t, J=6.8 Hz, 2H), 2.63 (t, J=5.2 Hz, 4H), 1.94 (apparent quintet, J=6.4 Hz, 2H).

Large Scale Prep:

A 1000 mL three-neck flask was charged with 1-chloro-4-hydroxy-9H-thioxanthen-9-one (100.0 g; 0.381 mol), 1-bromo-3-chloropropane (71.9 g; 0.457 mol), anhydrous potassium carbonate (63.1 g; 0.457 mol) and 2-butanone (500 mL). The mixture was stirred at reflux for 60 h. Full conversion was confirmed by TLC. The reaction mixture was filtered through a glass sinter, the inorganic solids were washed with warm dichloromethane (4×100 mL). The filtrate was evaporated to dryness to give a bright yellow solid. The crude 1-chloro-4-(3-chloropropoxy)-9H-thioxanthen-9-one (129.1 g) was dissolved in 2-butanone (400 mL) and sodium iodide (62.8 g; 0.419 mol) was added. The reaction mixture was refluxed for 16 h, filtered hot, the solids were washed with boiling 2-butanone (2×100 mL) and the filtrate evaporated to dryness.

The crude product from the previous step was suspended in THF (300 mL) and the suspension was charged over 30 min to neat diethanolamine (240.1 g; 2.28 mol) at 60° C. The reaction was heated to reflux for 3 h. The clear yellow-brown solution was poured into water (2000 mL) and extracted with ethyl acetate (3×750 mL). The aqueous phase was discarded and the organic phase was extracted with hydrochloric acid (1 M, 3×500 mL). The pH of the strongly acidic aqueous phase was adjusted to 12-13 by slow addition of 50% aq. NaOH to reprecipitate the product. The aqueous phase was reextracted with dichloromethane (4×500 mL), the organic phase dried (MgSO$_4$) and evaporated to dryness to give 4-{3-[bis(2-hydroxyethyl)amino]propoxy}-1-chloro-9H-thioxanthen-9-one (99.8 g; 64 yield).

Preparatory Example 5

(2-{3-[bis(2-hydroxyethyl)amino]propoxy}-4-methoxyphenyl)(phenyl)methanone

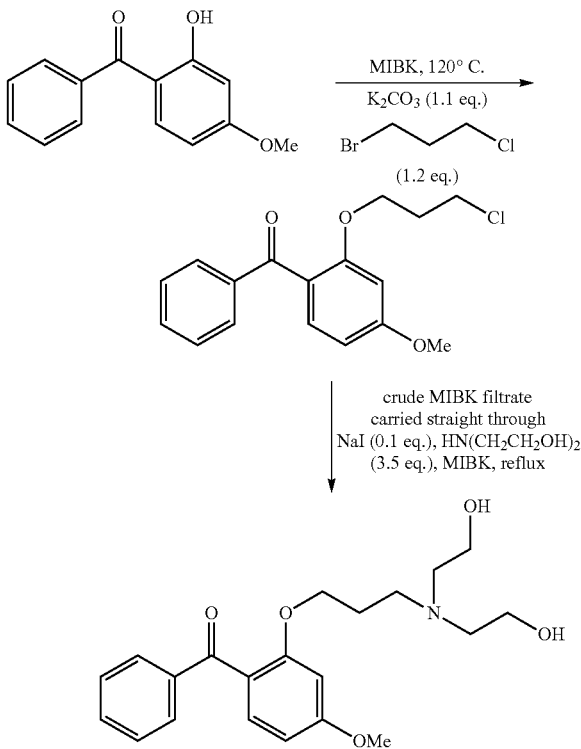

Large Scale Prep:

A 500 mL three-neck flask was charged with (2-hydroxy-4-methoxyphenyl)(phenyl) methanone (100.0 g; 0.4381 mol), 1-bromo-3-chloropropane (82.78 g; 0.5258 mol) and 4-methyl-2-pentanone (250 mL). Anhydrous potassium carbonate (66.61 g; 0.4819 mol) was added and the reaction mixture was stirred at reflux (120° C.) for 10 h. The reaction mixture was filtered hot and the inorganic solids were washed with 4-methyl-2-pentanone (2×100 mL). The filtrate was charged into a mixture of neat diethanolamine (161.2 g; 1.533 mol) and sodium iodide (6.57 g; 43.81 mmol). The reaction mixture heated to reflux (122° C.) for 24 h. The reaction mixture was cooled to room temperature and diluted with water (500 mL). The resulting emulsion was extracted with 4-methyl-2-pentanone (2×200 mL). The aqueous phase was discarded and the organic phase was extracted with 1 M HCl (2×500 mL). The aqueous phase was taken to pH 12 with 50% aqueous NaOH. The resulting emulsion was extracted with 4-methyl-2-pentanone (3×200 mL). The organic phase was separated, dried (MgSO$_4$), filtered and the solvent removed in vacuo. This provides (2-{3-[bis(2-hydroxyethyl)amino]propoxy}-4-methoxyphenyl)(phenyl)methanone (light yellow oil; 90.4 g; 55% yield over 3 steps).

$^1$H-NMR (400 MHZ, CDCL$_3$): 7.68-7.66 (M, 2H), 7.44 (TT, J=7.4, 1.4 HZ, 1H), 7.37 (D, J=8.4 HZ, 1H), 7.35-7.32 (M, 2H), 6.48 (DD, J=8.5, 2.3 HZ, 1H), 6.42 (D, J=2.3 HZ, 1H), 3.83 (T, J=5.8 HZ, 2H), 3.77 (S, 3H), 3.57 (BS, 2H), 3.39 (T, J=5.3 HZ, 4H), 2.37 (T, J=5.3 HZ, 4H), 2.18 (T, J=7.1 HZ, 2H), 1.49 (APPARENT QUINTET, J=6.5 HZ, 2H).

Preparatory Example 6

[3-(4-benzoylphenoxy)propyl]bis(2-hydroxyethyl) methylammonium iodide

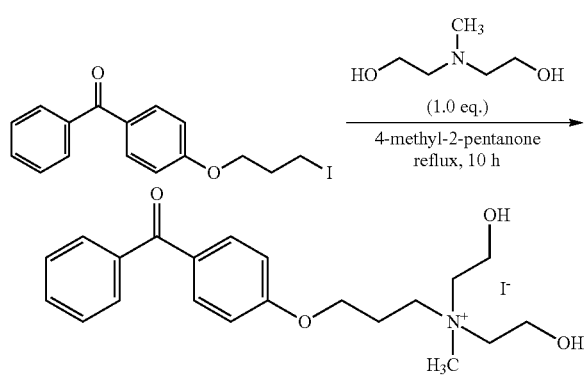

A two neck flask was charged with 4-(3-iodopropoxy) benzophenone (10.0 g; 27.3 mmol), N-methyldiethanolamine (3.25 g; 27.3 mmol) and 4-methyl-2-pentanone (100 mL). The reaction mixture was stirred vigorously and heated to reflux (118° C.) for 10 h. The solvent was evaporated and the residue was purified by chromatography on silica (eluent: methanol). This provided [3-(4-benzoylphenoxy)propyl]bis(2-hydroxyethyl)methylammonium iodide as off-white solid (10.86 g; 82%).

$^1$H-NMR (400 MHz, DMS-d$_6$): 7.75 (d, J=8.9 Hz, 2H), 7.69-7.63 (m, 3H), 7.55 (t, J=7.4 Hz, 2H), 7.10 (d, J=8.9 Hz, 2H), 5.27 (t, J=5.0 Hz, 2H), 4.17 (t, J=6.1 Hz, 2H), 3.87 (m, 4H), 3.62-3.58 (m, 2H), 3.53 (dd, J=6.7, 4.1 Hz, 4H), 3.16 (s, 3H), 2.25 (m, 2H).

$^{13}$C-NMR (100 MHZ, DMSO-D$_6$): 194.3, 161.7, 137.5, 132.1, 132.0, 129.5, 129.1, 128.4, 114.3, 65.1, 63.3, 59.6, 54.7, 49.2, 22.0.

Example 1

General Procedure for Preparation of Polymers (P)

A glass vial was charged with polyethylene glycol (M$_w$=2000). The reaction vessel was heated to 140° C. under vacuum for 1 h to remove all moisture. The reaction vessel was allowed to cool to 70° C. under vacuum and then charged with the appropriate amount of Reactint® dye and reactive photoinitiator (relative amounts given in Table 1). The reaction melt was thoroughly homogenised by stirring at 70° C. for 30 min. The appropriate amount of hexamethylene diisocyanate was added via syringe and the reaction vial was then sealed and heated with stirring to 70° C. for 16 h. This provided the appropriate polyurethane polymers as deep coloured semisolids.

The polymers were characterised by GPC (PLgel MIXED-E, eluent THF, flow rate 1 mL/min, refractive index detector).

Figure 2:
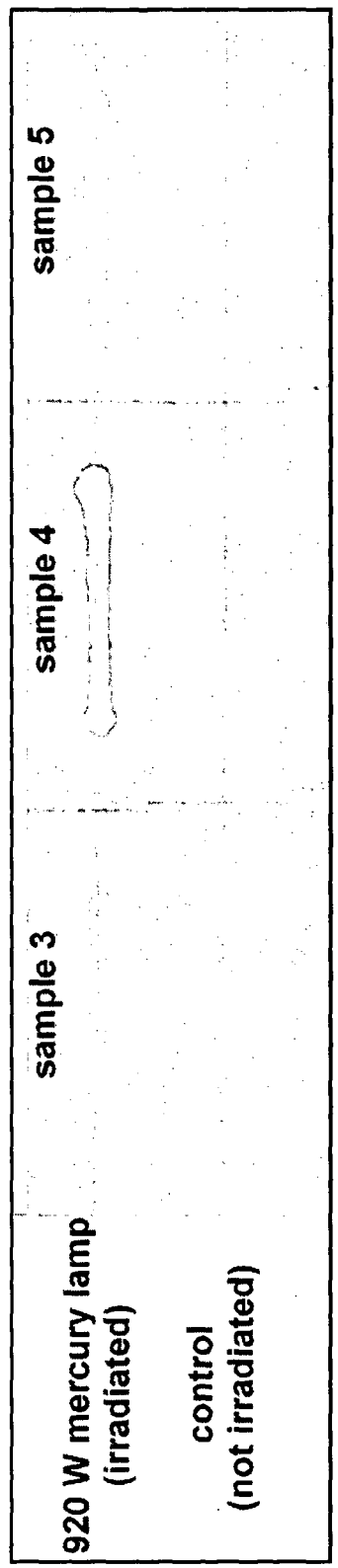
FIG. 2 shows fixing of dye samples 3-5 after 10 min dip test in methanol.

Ink Curing and Solvent Dip Test 10 wt % solutions of the polyurethane polymers in methanol were applied on standard inkjet paper (4 CC 100 g/m$^2$ for colour copying and printing) using a Pasteur pipette to make 5-10 cm long coloured streaks. The paper was dried at 50° C. for 1 min. The sheet of paper was then irradiated with DYMAX UVC-5 Curing System (Mercury 920 W bulb, conveyor belt speed 16.5 m/min, both sides of the paper irradiated 4 times). A dip test for fixation was then performed by immersing the sheet of paper in solvent (water or methanol) for 10 mins. A control dip test was performed in the same way without UV irradiating the paper. The degree of dye fixing after the dip test is shown in FIGS. 1-2.

Figure 3:
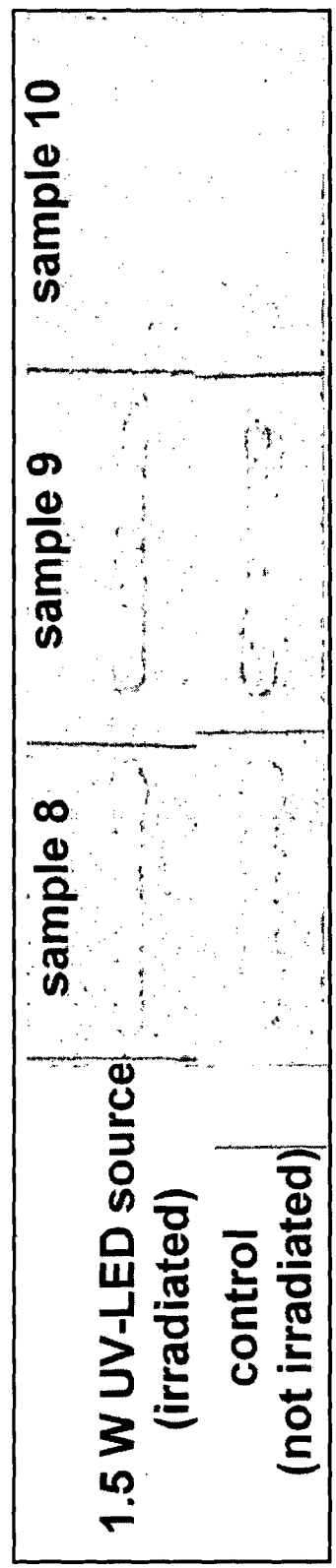
FIG. 3 shows fixing of dye samples 8-10 after 10 min dip test in water.

10 wt % methanolic solutions of samples 8-10 were applied to inkjet paper and dried as described above. The paper was then irradiated on both sides with UV-LED source Phoseon RX FireFly (1.5 W, 380-420 nm) for 5 seconds. The degree of dye fixing after the dip test is shown in FIG. 3.

Figure 4:
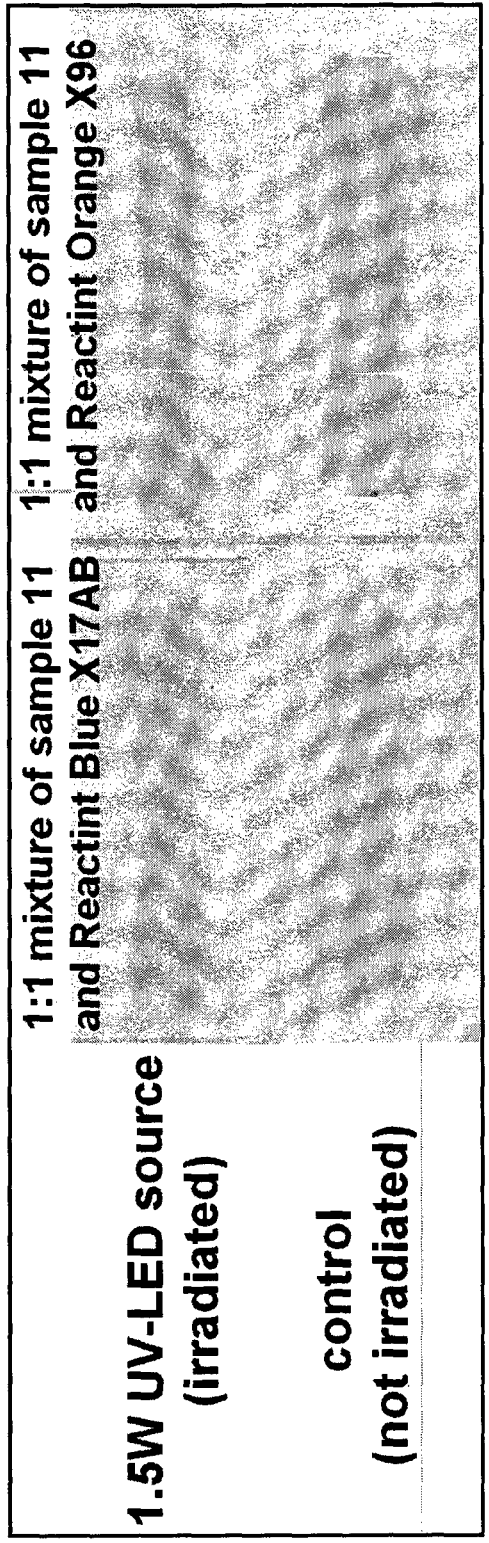
FIG. 4 shows fixing of monomeric dye and polymer sample 11 after 10 min dip test in water.

Fixation of a physical mixture of monomeric dye and photo-crosslinkable polymer sample 11 was also tested as described above using the Phoseon RX FireFly UV-LED source. The degree of dye fixing after the dip test is shown in FIG. 4.

In all cases, it can be seen that all samples which are not irradiated are more diffuse (i.e. less fixed) after the dip test in water or methanol. In addition, sample 11 (which was a 1:1 physical mixture of a polymer-bound photoinitiator and a dye) showed significant diffusion after the dip test.

Example 2

General Procedure for Preparation of End-Functionalized Polymers (P)

The polymer P was prepared as described in Example 1, and was subsequently taken up in THF. The acid chloride of a suitable acrylate was then reacted with equimolar amounts of triethylamine in THF and this mixture was then added to the polymer solution. After stirring the reaction overnight at room temperature, the reaction mixture was washed with a saline solution, dried and the solvent was then removed leaving the desired polymer.

TABLE 1

| sample No. | reactive PI | wt % | PEG-2000 wt % | Reactint ® dye | wt % | HDI wt % | polymer Mw | Mw/Mn |
|---|---|---|---|---|---|---|---|---|
| 1 | A | 2 | 87 | Reactint ® Red X64 | 2 | 9 | 12 kDa | 1.34 |
| 2 | " | 2 | 87 | Reactint ® Blue X17AB | 2 | 9 | 18 kDa | 1.52 |
| 3 | " | 5 | 74 | Reactint ® Red X64 | 10 | 11 | 16 kDa | 1.44 |
| 4 | " | 5 | 73 | Reactint ® Blue X17AB | 10 | 12 | 12 kDa | 1.58 |
| 5 | " | 5 | 75 | Reactint ® Orange X96 | 10 | 10 | 15 kDa | 1.69 |
| 6 | B | 2 | 87 | Reactint ® Red X64 | 2 | 9 | 20 kDa | 1.35 |
| 7 | " | 2 | 87 | Reactint ® Blue X17AB | 2 | 9 | 16 kDa | 1.27 |
| 8 | " | 10 | 68 | Reactint ® Red X64 | 10 | 12 | 10 kDa | 1.64 |
| 9 | " | 10 | 67 | Reactint ® Blue X17AB | 10 | 13 | 6 kDa | 1.56 |

TABLE 1-continued

| sample No. | reactive PI | wt % | PEG-2000 wt % | Reactint ® dye | wt % | HDI wt % | polymer Mw | Mw/Mn |
|---|---|---|---|---|---|---|---|---|
| 10 | " | 5 | 76 | Reactint ® Orange X96 | 10 | 9 | 14 kDa | 1.46 |
| 11 | " | 10 | 79 | NONE | 0 | 11 | 11 kDa | 1.36 |

A = 4-{3-[bis(2-hydroxyethyl)amino]propoxy}benzophenone
B = 4-{3-[bis(2-hydroxyethyl)amino]propoxy}-1-chloro-9H-thioxanthen-9-one

The invention claimed is:

1. A polymer comprising:
   a photoinitiator moiety covalently linked to the polymer, and
   a dye moiety covalently linked to the polymer,
   wherein the polymer is a co-polymer of a first monomer with a second monomer and optionally one or more additional monomers, wherein said first monomer comprises the photoinitiator moiety and said second monomer comprises the dye moiety and wherein the first monomer has a structure represented by formula (II):

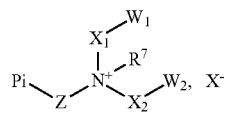

(II)

wherein:
Pi is a photoinitiator moiety;
Z is a linker moiety;
$X_1$ and $X_2$ are independently selected from optionally substituted $C_1$-$C_{12}$ alkylene, optionally substituted $C_1$-$C_{12}$ alkenylene; optionally substituted heterocyclyl; —O—; —S—; $NR^3$—, —C(=O)—; —C(=$NR^3$)—; —Si($R^3$)$_2$—O—; optionally substituted aryl; and combinations thereof, wherein $R^3$ is H or optionally substituted $C_1$-$C_{12}$ alkyl;
$W_1$ and $W_2$ are functional groups independently selected from alcohol; primary amine; secondary amine; thiol; alkoxy silane; silane esters of carboxylic acids; isocyanate; isothiocyanate; carboxylic acid; chloroformate; primary amide; secondary amide; urethane or urea groups;
$R^7$ is selected from optionally substituted $C_1$-$C_{12}$ alkyl, optionally substituted $C_3$-$C_{12}$ alkenyl, optionally substituted $C_3$-$C_{12}$ alkenyl, optionally substituted $C_3$-$C_{12}$ cycloalkyl, optionally substituted —[($C_1$-$C_6$ alkylene)-O—($C_1$-$C_6$ alkylene)]$_p$-H moiety, optionally substituted heterocyclyl, and optionally substituted aryl;
p is an integer from 1-6;
$X^-$ is a counterion, or a negatively charged moiety that is covalently bound to any carbon atom of Pi, Z, $R^7$, $X_1$, $X_2$ or their optional substituents, to form a betaine-type structure;
$X_1$ and $X_2$ or a part thereof may be linked to one another or to linker Z or $R^7$, to form one or more ring structures; and
Z, $R^7$, $X_1$ and $X_2$ are selected such that N is a quaternary amine.

2. The polymer according to claim 1, wherein the photoinitiator moiety and the dye moiety are pendant on the polymer chain.

3. The polymer according to claim 1, wherein at least three photoinitiator moieties and at least three dye moieties are pendant on the polymer chain.

4. A polymer, comprising a photoinitiator moiety covalently linked to the polymer and a dye moiety covalently linked to the polymer, wherein the polymer has a structure of formula (III):

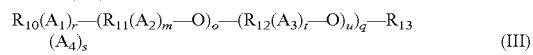

(III)

wherein:
$A_2$ is a photoinitiator moiety;
$A_3$ is a dye moiety;
$A_1$ and $A_4$ are identical or different photoinitiator moieties or identical or different dye moieties;
$R_{11}$ and $R_{12}$ are identical or different, linear or branched alkyl or cycloalkyl groups;
$R_{10}$ and $R_{13}$ are identical or different, linear or branched alkyl or cycloalkyl groups or aryl groups or are selected from H, OH, CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates, polyethylenes, polypropylenes, polyesters, polyamides, polyacrylates and polyurethanes;
and m, t, o, u, q, r and s are each independently an integer in the range of from 1-10000.

5. The polymer according to claim 1, wherein the photoinitiator moiety is selected from Norrish Type-II photoinitiators.

6. The polymer according to claim 1, comprising two or more structurally different photoinitiator moieties.

7. The polymer according to claim 1, wherein the dye moiety has a visible light absorption between 400-700 nanometers.

8. The polymer according to claim 1, wherein the dye moiety has a light absorption between 700-1500 nanometers.

9. An ink comprising a polymer according to claim 1, and a solvent.

10. The ink according to claim 9, wherein the polymer and the solvent form a solution.

11. The ink according to claim 9, wherein the polymer and the solvent form an emulsion.

* * * * *